US007388876B2

(12) United States Patent
Miyashita et al.

(10) Patent No.: US 7,388,876 B2
(45) Date of Patent: Jun. 17, 2008

(54) METHOD AND SYSTEM FOR TRANSMITTING DATA IN TWO STEPS BY USING DATA STORAGE PROVIDED IN DATA TRANSMISSION EQUIPMENT IN NETWORK

(75) Inventors: Takuya Miyashita, Kawasaki (JP);
Chiyoko Komatsu, Kawasaki (JP);
Yoshinobu Takagi, Kawasaki (JP);
Hirotaka Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1083 days.

(21) Appl. No.: 10/115,542

(22) Filed: Apr. 3, 2002

(65) Prior Publication Data

US 2003/0091057 A1    May 15, 2003

(30) Foreign Application Priority Data

Nov. 9, 2001    (JP) ............................. 2001-344277

(51) Int. Cl.
*H04L 12/54* (2006.01)

(52) U.S. Cl. .................... 370/428; 709/229; 711/123

(58) Field of Classification Search ................ 370/422, 370/428, 429, 539, 540; 709/203, 211, 216, 709/229, 231, 232; 711/118, 154, 155
See application file for complete search history.

(56) References Cited

U.S. PATENT DOCUMENTS

| | | | | |
|---|---|---|---|---|
| 4,829,227 A | * | 5/1989 | Turner | 370/422 |
| 5,040,170 A | * | 8/1991 | Upp et al. | 398/50 |
| 5,544,347 A | * | 8/1996 | Yanai et al. | 711/162 |
| 5,581,740 A | * | 12/1996 | Jones | 703/25 |
| 5,966,509 A | * | 10/1999 | Abe et al. | 714/4 |
| 6,370,571 B1 | * | 4/2002 | Medin, Jr. | 709/218 |
| 6,427,145 B1 | * | 7/2002 | Hara et al. | 707/3 |
| 6,636,952 B1 | * | 10/2003 | Zhang et al. | 711/154 |
| 6,654,747 B1 | * | 11/2003 | Van Huben et al. | 707/10 |
| 6,859,865 B2 | * | 2/2005 | De Margerie et al. | 711/162 |
| 6,976,154 B1 | * | 12/2005 | Dyckerhoff et al. | 712/220 |
| 2002/0141256 A1 | * | 10/2002 | Barri et al. | 365/200 |
| 2002/0161911 A1 | * | 10/2002 | Pinckney et al. | 709/231 |
| 2003/0050974 A1 | * | 3/2003 | Mani-Meitav et al. | 709/203 |

FOREIGN PATENT DOCUMENTS

| | | |
|---|---|---|
| JP | 04-58630 | 2/1992 |
| JP | 06-103232 | 4/1994 |

(Continued)

*Primary Examiner*—Chi Pham
*Assistant Examiner*—Kevin Mew
(74) *Attorney, Agent, or Firm*—Katten Muchin Rosenman LLP

(57) ABSTRACT

In a method for transmitting data from a first node to a second node through an interlinking network including data transmission equipments: the data is transmitted from the first node to one of the data transmission equipments together with a first request for storage of the data in the one of the data transmission equipments; the data is stored in a storage unit provided in the one of the data transmission equipments in response to the first request; a second request for the data is transmitted from the second node to the one of the data transmission equipments; the data is read out from the storage unit in response to the second request; and the data is transmitted from the one of the data transmission equipments to the second node.

12 Claims, 23 Drawing Sheets

FOREIGN PATENT DOCUMENTS

| | | |
|---|---|---|
| JP | 07-044509 | 2/1995 |
| JP | 07-202838 | 8/1995 |
| JP | 08-186556 | 7/1996 |
| JP | 10-21174 | 1/1998 |
| JP | 10-247883 | 9/1998 |
| JP | 2000-036797 | 2/2000 |
| JP | 2000-188593 | 7/2000 |

* cited by examiner

| No. | CONTROL INFORMATION ITEM | FUNCTION |
|---|---|---|
| 1 | DATA STORAGE REQUEST | REQUEST FOR STORAGE OF OBJECT DATA IN STORAGE MEDIUM |
| 2 | DATA READOUT REQUEST | REQUEST FOR READOUT OF OBJECT DATA FROM STORAGE MEDIUM |
| 3 | DATA ERASING REQUEST | REQUEST FOR ERASING OF OBJECT DATA |
| 4 | DATA LOCK REQUEST | REQUEST FOR PROTECTION AGAINST ERASING OF OBJECT DATA |
| 5 | DATA UNLOCK REQUEST | REQUEST FOR REMOVAL OF PROTECTION AGAINST ERASING OF OBJECT DATA |
| 6 | DATA ID | ID FOR SPECIFYING OBJECT DATA |
| 7 | DATA AMOUNT INFORMATION | SIZE OF OBJECT DATA |
| 8 | DATA POSITION INFORMATION | POSITION OF OBJECT DATA IN MAIN SIGNAL |
| 9 | DESTINATION INFORMATION | DESTINATION OF OBJECT DATA |
| 10 | SOURCE INFORMATION | SOURCE OF OBJECT DATA |
| 11 | OTHER | FOR FUTURE EXTENSION |

FIG. 6

METHOD AND SYSTEM FOR TRANSMITTING DATA IN TWO STEPS BY USING DATA STORAGE PROVIDED IN DATA TRANSMISSION EQUIPMENT IN NETWORK

BACKGROUND OF THE INVENTION

1) Field of the Invention

The present invention relates to a method for transmitting data from a first network node (e.g., an information server) to a second network node (e.g., a client) through an interlinking network which includes a plurality of transmission equipments. The present invention also relates to a data transmission system including a plurality of transmission equipments and transmitting data from a first network node to a second network node. The present invention further relates to a transmission equipment used in a data transmission system interconnecting first and second network nodes.

2) Description of the Related Art

Recently, the bandwidths of local networks have been increased, and the bandwidths of the access networks have also been increased by the development of the technologies of XDSL (X Digital Subscriber Line), FTTH (Fiber To The Home), and the like. With the increase in the bandwidths of the local and access networks, business opportunities are increasing, and various services are becoming available. In such a situation, increase in the bandwidths of backbone or interlinking networks (e.g., use of broadband networks) is also required.

In particular, attempts are currently made to transmit data requiring wide bandwidth (e.g., sound data or image data) by using the IP (Internet Protocol) platform. For example, in some applications such as delivery of radio programs or music, the attempted data transmission has become commercially practical. In addition, low-quality image delivery services have already become commercially practical.

Currently, in order to realize the above data transmission using the IP platform, many distributed systems have been constructed by arranging a number of cache servers in the Internet. In such distributed systems, data are delivered by network elements using the IP multicast technique.

In addition, in order to increase the overall throughput of the data transmission system and realize music or images delivery services to a wide area, attempts have been made to directly connect a LAN (Local Area Network) to a broadband, backbone or interlinking network such as a SONET (or SDH) network or a WDM (Wavelength Division Multiplex) network. It is considered that the direct connection of a LAN to a SONET (or SDH) network or a WDM network will be widely used in the future.

Next, the data transmission using the IP platform and the transmission through the SONET (or SDH) network are explained below.

(i) Data Transmission Using IP Platform

FIG. 20 is a diagram illustrating an example of a conventional image delivery or cable television system which uses the Internet. The example of FIG. 20 has a typical LAN-WAN (Wide Area Network)-LAN configuration.

In FIG. 20, reference numeral 10 denotes a camera, 11 denotes an image transfer equipment, 12 denotes an image server, 13 denotes an L2 (Layer 2) switch, 14 denotes an IIP (Internet Imaging Protocol) router, 15 denotes a WAN, 16 denotes an IIP router, 17 denotes an image server, 18 denotes an L2 switch, and 19-1 to 19-3 each denote a client.

The camera 10 captures an image of an object and sound, converts the image and sound into digital data, and outputs the digital data. The image transfer equipment 11 generates an IP packet containing the digital data output from the camera 10, and transmits the IP packet through the L2 switch 13. Each of the image servers 12 and 17 temporarily stores image data, and transmits the image data in response to a request from the clients 19-1 to 19-3. Each of the L2 switches 13 and 18 performs packet switching in the data link layer. Each of the IIP routers 14 and 16 transfers image data in accordance with a protocol for exchanging image data and related information.

For example, the WAN 15 is realized by an ATM (Asynchronous Transfer Mode) network, a SONET (or SDH) network, an ISDN network, or the like, and uses the MPLS (Multiprotocol Label Switching) technique.

Each of the clients 19-1 to 19-3 receives image data and displays an image.

The image data and sound data output from the camera 10 are delivered to the clients 19-1 to 19-3 in different manners according to the services requested by the clients 19-1 to 19-3.

In a first type of service, the image data and the sound data output from the camera 10 are temporarily stored in the image server 17. Thereafter, when one of the clients 19-1 to 19-3 makes a request for the image data and the sound data, the image data and the sound data are transmitted to the one of the clients 19-1 to 19-3 through the L2 switch 18.

In a second type of service (real-time delivery service), the image data and the sound data output from the camera 10 are first contained in an IP packet by the image transfer equipment 11, and then multicast delivered to the clients 19-1 to 19-3 by using the IP multicast technique.

However, the volume of image data transmitted in the conventional image delivery or cable television system is basically great. In particular, television broadcasting constantly requires for each channel a bandwidth of 3 to 10 Mbit/s in the case of standard definition television data and 20 Mbit/s in the case of high definition television data. In the case of sound data, a bandwidth of 80 to 130 Kbit/s is required.

Therefore, the conventional system is sufficient to deliver the sound data. However, in order to deliver the image data, it is necessary to control the bandwidth and increase the transmission rate in the entire system including the LANs and WANs. For example, in the case where 10 channels of high definition television data are delivered, a bandwidth of 200 Mbps (=20 Mbps×10 ch) is constantly required.

Nevertheless, the constant flow of the above traffic impedes transmission of other information, and is not economical.

It is well known that bottlenecks in networks are typically caused by differences in the interface speed between LANs and WANs. For example, many WANs have ISDN (64/1,544 Kbps DS1), ATM (155 Mbps), or XDSL interfaces for connection to users. In addition, in an increasing number of cases of transmission, data transmitted from the users through the ISDN, ATM, or XDSL interfaces are multiplexed by using the SONET or SDH technology and transmitted through transmission lines of OC-3 (155 Mbps), OC-12 (622 Mbps), OC-48 (2.5 Gbps), OC-192 (10 Gbps), or the like. In order to realize the above operation, for example, a POS (Packet Over Sonet) unit is installed in IP routers. On the other hand, recently, many LANs uses the Ethernet having a transmission rate of 100 Mbps or 1 Gbps. That is, the bandwidths of the interfaces between the WANs and the LANs are much smaller than those of the LANs and WANs, and the transmission is delayed by the small bandwidths of the interfaces between the WANs and the LANs.

Further, in transmission of a great amount of images and sound data, images and sound received by clients (users' PCs) may be interrupted when packets are delayed, discarded, or disordered by the influence of the reduction of the bandwidth in the WAN and the best effort transmission of IP packets.

In order to solve the above problem, conventionally, cache servers are distributed in the Internet so that information is stored by the cache servers, and the delay, discard, and disorder of the packets are absorbed.

FIG. 21 is a diagram illustrating an example of a configuration of cache servers in the Internet. In FIG. 21, the other network elements such as IP routers and hubs are not shown.

As illustrated in FIG. 21, the cache servers 30a to 30d are distributed in the WAN 30, the clients 31 and 32 are connected to the cache server 30d, the clients 33 and 34 are connected to the cache server 30c, and the client 35 is connected to the cache server 30b.

Since the cache servers 30a to 30d are arranged near the corresponding clients 31 to 35, it is possible to avoid inefficient access to original contents in response to each connection request, improve response, and reduce traffic.

(ii) Conventional SONET or SDH System

The SONET transmission equipments are high-speed transmission equipments mainly used in backbone networks of network providers, and various data such as data of telephones, leased lines, and IP packets, for which the network providers provide service, are transmitted through the SONET transmission equipments. The SONET transmission equipments multiplex such data into a high-speed transmission signal having a transmission rate of 2.5 Gbps, 10 Gbps, 40 Gbps, or the like, and transmit the high-speed transmission signal through a single optical fiber, by using the SONET or SDH technology. In SONET or SDH networks, each path has uniform traffic, and synchronism is maintained.

FIG. 22 is a diagram for explaining the bandwidths of incoming lines and corresponding outgoing lines. In the path indicated by the double lines with arrows the example of FIG. 22, the transmission line incoming into the SONET transmission equipment 40 and the transmission line outgoing from the SONET transmission equipment 41 have an identical transmission rate 2.5 Gbps. On the other hand, in the path indicated by the single lines with arrows, the transmission line incoming into the SONET transmission equipment 43 has an transmission rate 2.5 Gbps, and the transmission line outgoing from the SONET transmission equipment 42 has an transmission rate 622 Mbps. This is impractical.

In the packet transmission of data, basically, more than one network terminal shares a transmission line (i.e., a bandwidth of a transmission line), and the synchronism is not secured. On the other hand, in the SONET networks, bandwidth allocation to each transmission line is predetermined, and the synchronism is maintained.

However, conventionally, in order to provide a broadband service in a wide area, cache servers and other network elements are required to be distributed over the wide area under various conditions. Therefore, sufficient bandwidths are not necessarily secured between a data source server and the cache servers. In this case, the amount of data output from the data source server is limited. Thus, even when the bandwidth is great in only a portion (e.g., in an interlinking network such as a SONET or SDH network) of a transmission path between the data source server and each cache server, the great bandwidth of the portion cannot be efficiently used.

Further, in a broadband service such as an image or sound delivery service, data sent to the respective cache servers are often identical. However, conventionally, the data source server is required to send the identical data to each cache server separately. FIG. 23 is a diagram illustrating an example of a configuration for transmitting data from a data source server to a plurality of cache servers in a conventional data delivery service system. In the example of FIG. 23, the contents server (data source server) 51 is required to send identical data to each of the cache servers 52 to 54, i.e., the contents server 51 is required to transmit the identical data three times. Therefore, utilization efficiency of the bandwidth of the WAN 50 is low.

SUMMARY OF THE INVENTION

An object of the present invention is to provide a method for efficiently transmitting a great volume of data such as image data or sound data from a first network node to a second network node through an interlinking network.

Another object of the present invention is to provide a data transmission system which can efficiently transmit a great volume of data such as image data or sound data from a first network node to a second network node through an interlinking network.

A further object of the present invention is to provide a data transmission equipment which can be used in a data transmission system, and realize efficient transmission of a great volume of data such as image data or sound data in the data transmission system.

(I) According to the first aspect of the present invention, there is provided a method for transmitting data from a first network node to a second network node through an interlinking network including a plurality of data transmission equipments. The method comprises the steps of: (a) transmitting the data together with a first request for storage of the data in one of the plurality of data transmission equipments, from the first network node to the one of the plurality of data transmission equipments; (b) receiving the data and the first request by the one of the plurality of data transmission equipments; (c) storing the data in a storage unit provided in the one of the plurality of data transmission equipments, based on the first request; (d) transmitting a second request for the data, from the second network node to the one of the plurality of data transmission equipments; (e) receiving the second request by the one of the plurality of data transmission equipments; (f) reading out the data from the storage unit based on the second request; and (g) transmitting the data from the one of the plurality of data transmission equipments to the second network node.

According to the first aspect of the present invention, data transmitted from the first network node is temporarily stored in the storage unit in the one of the plurality of data transmission equipments in accordance with the first request, and is thereafter transmitted to the second network node in response to a second request from the second network node. Therefore, the transmission of data from the first network node to the one of the plurality of data transmission equipments can be performed independently of the transmission rate between the one of the plurality of data transmission equipments and the second network node, and can be therefore performed at high speed. In addition, the data can be transmitted from the one of the plurality of data transmission equipments to the second network node at a transmission rate which is optimum for the second network node.

Further, the operations for readout and transmission of the data to the second network node do not affect traffic between the first network node and the one of the plurality of data transmission equipments.

In the method according to the first aspect of the present invention, the step (d) may comprise the substeps of: (d1) transmitting the second request from the second network node to the first network node; and (d2) transferring the second request from the first network node to the one of the plurality of data transmission equipments.

In addition, in the step (a), the data and the first request may be multiplexed.

(II) According to the second aspect of the present invention, there is provided a data transmission system comprising: a plurality of network nodes; and an interlinking network which includes a plurality of data transmission equipments, interlinks the plurality of network nodes, and transmits data between the plurality of network nodes in a multiplexed form. In the data transmission system, one of the plurality of data transmission equipments includes: a reception unit which receives first data; a control information extraction unit which extracts control information from the first data received by the reception unit; a data acquisition unit which determines whether or not the control information includes a request for storage of the first data, and acquires the first data when the control information includes the request for storage of the first data; and a data storage unit which stores the first data acquired by the data acquisition unit.

In the data transmission system according to the second aspect of the present invention, the one of the plurality of data transmission equipments may further include: a data readout unit which determines whether or not the control information includes a request for readout of second data stored in the data storage unit, and reads out the second data from the data storage unit when the control information includes the request for readout of the second data; and a transmission unit which transmits the second data to a destination.

(III) According to the third aspect of the present invention, there is provided a data transmission equipment for use as a constituent of a multiplex transmission network. The data transmission equipment comprises: a reception unit which receives first data; a control information extraction unit which extracts control information from the first data received by the reception unit; a data acquisition unit which determines whether or not the control information includes a request for storage of the first data, and acquires the first data when the control information includes the request for storage of the first data; and a data storage unit which stores the first data acquired by the data acquisition unit.

The data transmission equipment according to the third aspect of the present invention may also have one or any possible combination of the following additional features (i) to (x). p (i) The data transmission equipment according to the third aspect of the present invention may further comprise: a data readout unit which determines whether or not the control information includes a request for readout of second data stored in the data storage unit, and reads out the second data from the data storage unit when the control information includes the request for readout of the second data; and a transmission unit which transmits the second data to a destination. p (ii) The reception unit receives the first data at a first transmission rate, the transmission unit transmits the second data at a second transmission rate, and the first and second transmission rates can be determined independently of each other. p (iii) The transmission unit transmits the second data to a plurality of destinations. p (iv) The data transmission equipment according to the third aspect of the present invention may further comprise a control information insertion unit which inserts control information in the second data transmitted by the transmission unit. p (v) The data transmission equipment according to the third aspect of the present invention may further comprise a data erasing unit which determines whether or not the control information includes a request for erasing of third data stored in the data storage unit, and erases the third data from the data storage unit when the control information includes the request for erasing of the third data p (vi) The data storage unit is arranged in the reception unit. p (vii) The data storage unit is arranged in the transmission unit. p (viii) The data transmission equipment according to the third aspect of the present invention may further comprise a switch unit which cross-connects transmission lines, and the data storage unit is arranged in the switch unit. p (ix) The reception unit receives the first data in accordance with one of SONET and SDH technologies. p (x) The transmission unit transmits the second data in accordance with one of SONET and SDH technologies. p (IV) The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 6 shows examples of information items which can be included in control information;

DESCRIPTION OF THE PREFERRED EMBODIMENTS

Embodiments of the present invention are explained in detail below with reference to drawings.

(1) Basic Construction

Figure 1:
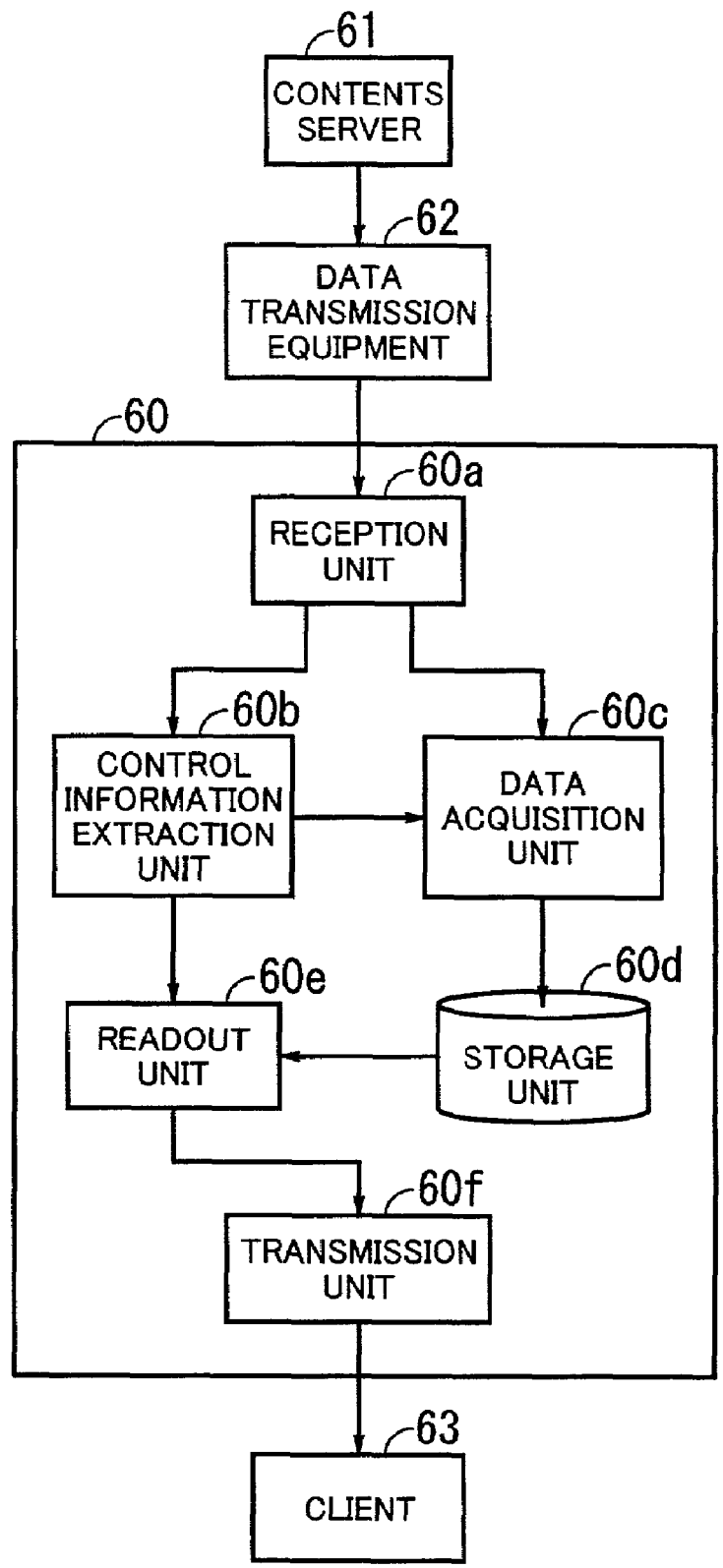
FIG. 1 is a diagram illustrating a basic construction of the data transmission system according to the present invention.

FIG. 1 is a diagram illustrating a basic construction of the data transmission system according to the present invention. In FIG. 1, reference numeral 61 denotes a contents server, 60 and 62 each denote a data transmission equipment, and 63 denotes a client. As illustrated in FIG. 1, the data transmission equipments 62 and 60 are connected between the contents server 61 and the client 63, and constitute a WAN. The contents server 61 transmits data (e.g., image data) to be supplied to the client 63. For example, the client 63 is a terminal of a user, and realized by a personal computer. The WAN may include other data transmission equipments, and the data transmission system of FIG. 1 may include other client.

The data transmission equipment 60 comprises a reception unit 60a, a control information extraction unit 60b, a data acquisition unit 60c, a storage unit 60d, a readout unit 60e, and a transmission unit 60f.

The reception unit 60a in the data transmission equipment 60 receives data transmitted from the data transmission equipment 62. The control information extraction unit 60b extracts control information from the data received by the reception unit 60a. When the control information extracted by the control information extraction unit 60b includes a request for storage of data, the data acquisition unit 60c acquires the data from the data received by the reception unit 60a. The storage unit 60d stores the data acquired by the data acquisition unit 60c. When the control information extracted by the control information extraction unit 60b includes a request for readout of the data stored in the storage unit 60d, the readout unit 60e reads out the data from the storage unit 60d. The transmission unit 60f transmits to the client 63 the data read out by the readout unit 60e.

(2) Operation of Basic Construction

First, the contents server 61 supplies to the data transmission equipment 62 data (for example, image data) and a request for storage of the image data in the storage unit 60d in the data transmission equipment 60. When the data transmission equipment 62 receives the image data and the request for storage, the data transmission equipment 62 generates first control information which indicates the requests for storage of the image data in the storage unit 60d in the data transmission equipment 60, based on the image data, and transmits the image data and the first control information to the data transmission equipment 60. The reception unit 60a in the data transmission equipment 60 receives the image data and the first control information transmitted from the data transmission equipment 62. The first control information extraction unit 60b in the data transmission equipment 60 extracts the first control information, recognizes that the first control information includes a request for storage, and supplies the first control information to the data acquisition unit 60c. The data acquisition unit 60c acquires a portion or all of the image data associated with the first control information, and stores the portion or all of the image data in an area of the storage unit 60d.

In the above operations, the transmission of data from the contents server 61 to the data transmission equipment 60 can be performed independently of the transmission rate between the data transmission equipment 60 and the client 63, and can be therefore performed at high speed.

Next, when the client 63 sends to the contents server 61 a request for readout of the image data from the storage unit 60d in the data transmission equipment 60 in the situation in which the image data is stored in the storage unit 60d in the data transmission equipment 60, the contents server 61 sends to the data transmission equipment 60 through the data transmission equipment 62 second control information which indicates the request for readout of the image data from the storage unit 60d in the data transmission equipment 60. The control information extraction unit 60b in the data transmission equipment 60 extracts the second control information, recognizes that the second control information includes a request for readout, and supplies the second control information to the readout unit 60e. The readout unit 60e reads out from the storage unit 60d a portion or all of the image data stored in the storage unit 60d and designated by the second control information, and supplies to the transmission unit 60f the portion or all of the image data read out from the storage unit 60d. The transmission unit 60f transmits to the client 63 the portion or all of the image data read out from the storage unit 60d.

During the above operations for readout and transmission to the client 63, only the second control information is transmitted between the contents server 61 and the data transmission equipment 60. Therefore, the operations for readout and transmission to the client 63 do not affect data transmission for the other users.

In addition, the transmission rate between the transmission unit 60f in the data transmission equipment 60 and the client 63 can be determined independently of the transmission rate between data transmission equipment 62 and the data transmission equipment 60. Therefore, the data can be transmitted from the data transmission equipment 60 to the client 63 at an optimum transmission rate for the client 63.

When a plurality of clients are connected to the transmission unit 60f, the transmission unit 60f can concurrently transmit identical data to the plurality of clients.

As explained above, in the data transmission system according to the present invention, the storage unit 60d is provided in the data transmission equipment 60 for storing data supplied by the contents server 61, and thereafter, the data is read out and transmitted to the client 63 in response to a request from the client 63. Therefore, the transmission of data from the contents server 61 to the data transmission equipment 60 is not affected by the transmission rate between the data transmission equipment 60 and the client 63 and can be performed at high speed. In addition, the transmission of data from the data transmission equipment 60 to the client 63 can be performed at an optimum transmission rate for the client 63.

(3) Construction of First Embodiment

Figure 2:
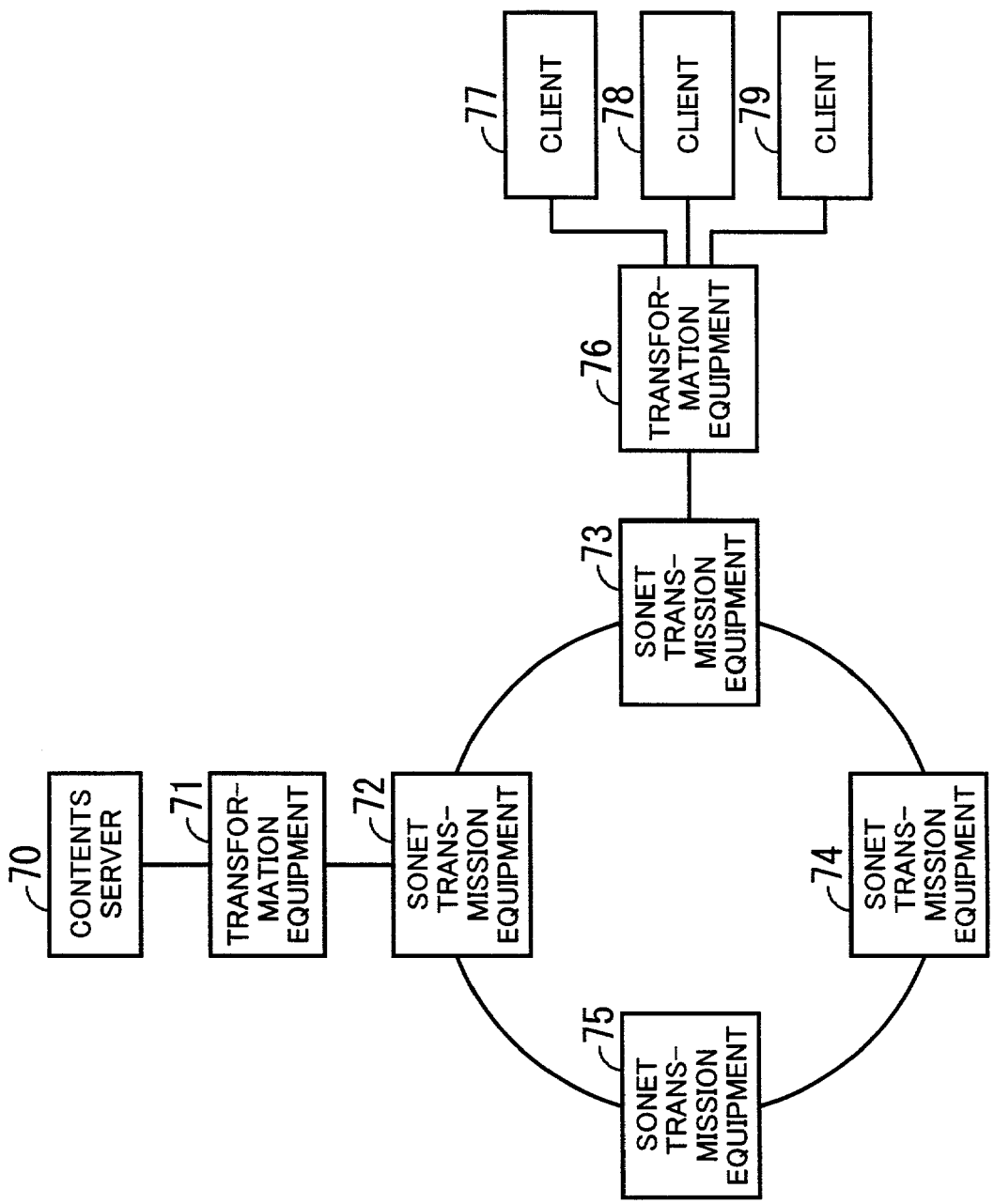
FIG. 2 is a diagram illustrating an example of a data transmission system as a first embodiment of the present invention.

FIG. 2 is a diagram illustrating an example of a data transmission system as the first embodiment of the present invention. In FIG. 2, reference numeral 70 denotes a contents server, 71 and 76 each denote a transformation equipment, 72 to 75 each denote a SONET transmission equipment, and 77 to 79 each denote a client.

The contents server 70 stores image data and sound data, and transmits a portion of the image data and sound data in response to a request from the clients 77 to 79 or an information provider, which provides information delivery services and is not shown in FIG. 2.

Hereinafter, for simplicity of explanation, it is assumed that the data transmitted in the data transmission system according to the present invention are image data. However, any data which do not require real-time transmission can be transmitted in the data transmission system according to the present invention.

The transformation equipment 71 receives IP packets being transmitted from the contents server 70 and containing image data and control information, transforms the IP packets into SONET frames, and transmits the SONET frames to the SONET transmission equipment 72. In the SONET frames, the image data and the control information are associated with each other.

Figure 3:
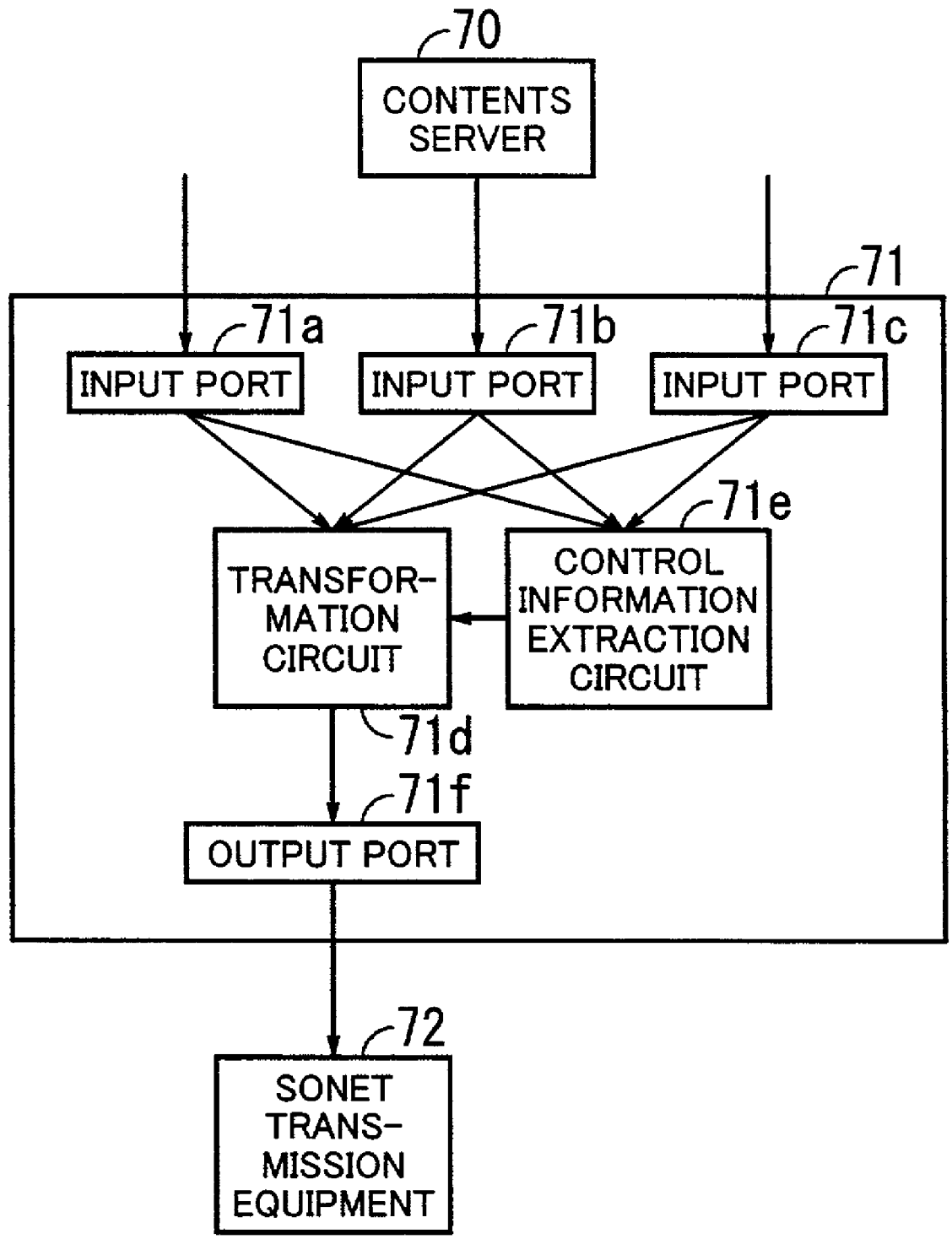
FIG. 3 is a diagram illustrating an example of a construction of the transformation equipment 71.

FIG. 3 is a diagram illustrating an example of a construction of the transformation equipment 71. The transformation equipment 71 of FIG. 3 comprises input ports 71a to 71c, a transformation circuit 71d, a control information extraction circuit 71e, and an output port 71f. The input ports 71a to 71c are connected to the contents server 70 and other nodes (not shown), and the transformation equipment 71 receives IP packets through the input ports 71a to 71c.

The control information extraction circuit 71e extracts control information from the IP packets received through the input ports 71a to 71c, and supplies the extracted control information to the transformation circuit 71d. The transformation circuit 71d transforms the IP packets into SONET frames, and supplies the SONET frames to the output port 71f. The control information extracted by the control information extraction circuit 71e is inserted in the SONET frames as a portion of overhead information. The output port 71f transmits the SONET frames to the SONET transmission equipment 72.

Referring back to FIG. 2, the transformation equipment 76 receives SONET frames from the SONET transmission equipment 73, transforms the received SONET frames into IP packets, and transmits the IP packets to the clients 77 to 79 according to control information contained in the received SONET frames.

Figure 4:
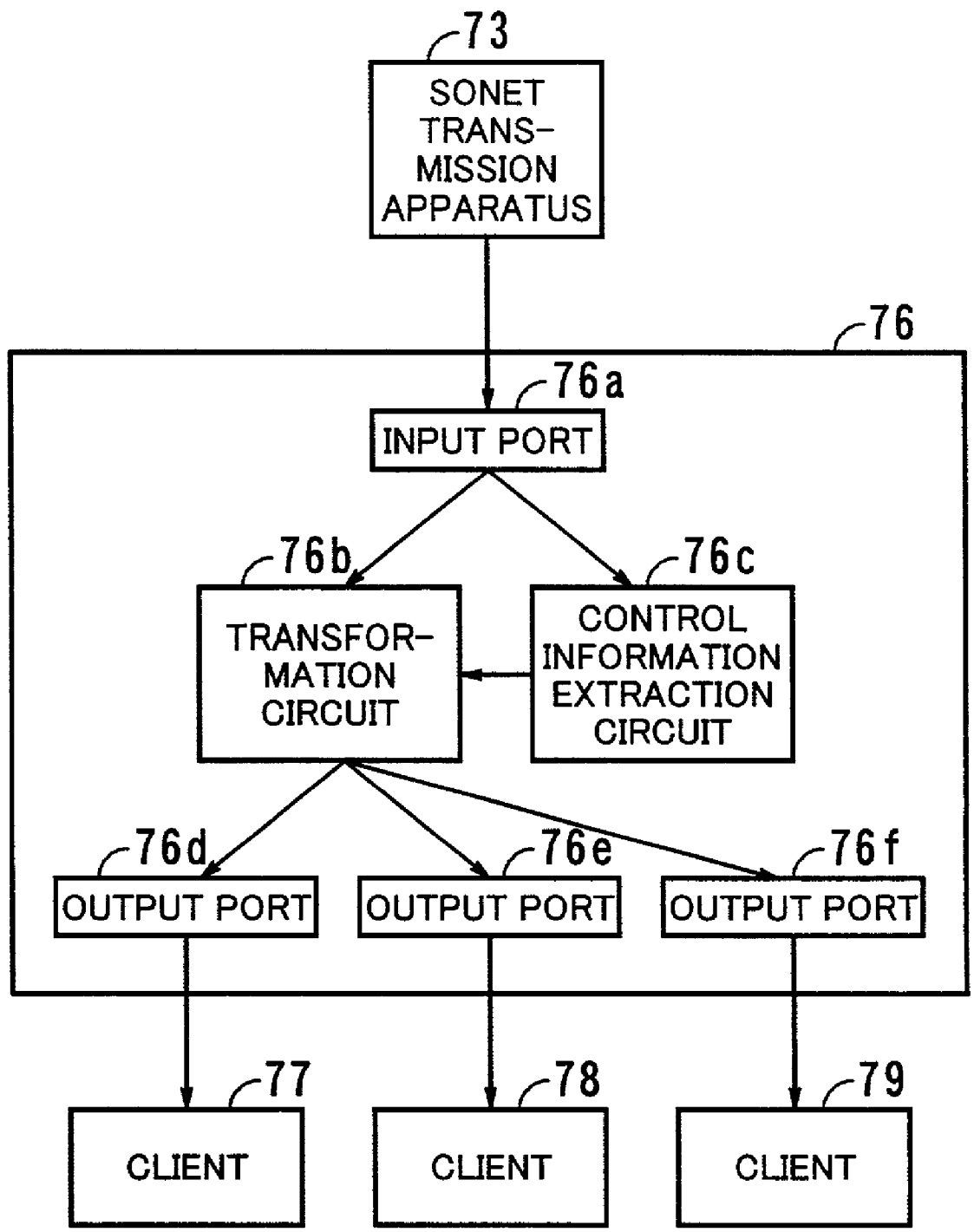
FIG. 4 is a diagram illustrating an example of a construction of the transformation equipment 76.

FIG. 4 is a diagram illustrating an example of a construction of the transformation equipment 76. The transformation equipment 76 of FIG. 4 comprises an input port 76a, a transformation circuit 76b, a control information extraction circuit 76c, and output ports 76d to 76f. The transformation equipment 76 receives SONET frames from the SONET transmission equipment 73 through the input port 76a. The control information extraction circuit 76c extracts control information from the SONET frames received through the input port 76a, and supplies the extracted control information to the transformation circuit 76b. The transformation circuit 76b transforms the received SONET frames into IP packets, and transmits the IP packets to the output ports 76d to 76f. The control information extracted by the control information extraction circuit 76c is inserted in the headers of the IP packets. The IP packets are transmitted to the clients 77 to 79 through the output ports 76d to 76f. Alternatively, the output ports 76d to 76f in the transformation equipment 76 may be replaced with a single output port. In this case, the IP packets output from the single output port can be transferred to the clients 77 to 79 by using a router or the like.

Referring back to FIG. 2, the SONET transmission equipments 72 to 75 each have a function of a SONET ADM (add-drop multiplexer), and realize high-speed data transmission by multiplexing and demultiplexing received data. In the example of FIG. 2, the SONET transmission equipments 72 to 75 constitute a RING network which transmits, for example, OC-768 signals having a transmission rate of 40 Gbps.

Figure 5:
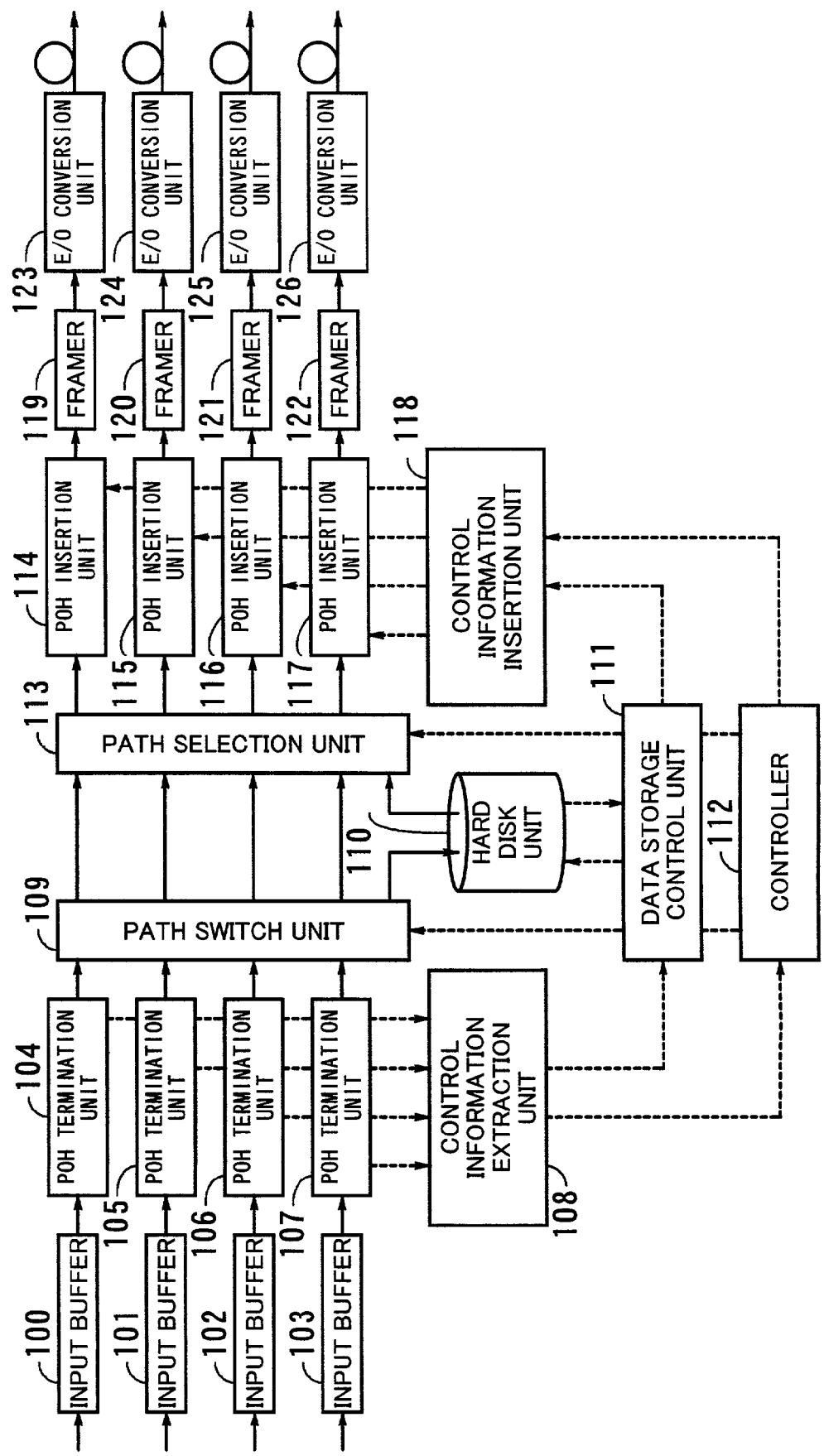
FIG. 5 is a diagram illustrating an example of a construction of the SONET transmission equipment 73.

FIG. 5 is a diagram illustrating an example of a construction of the SONET transmission equipment 73. The SONET transmission equipment 73 of FIG. 5 comprises input buffers 100 to 103, POH termination units 104 to 107, a control information extraction unit 108, a path switch unit 109, a hard disk unit 110, a data storage control unit 111, a controller 112, a path selection unit 113, POH insertion units 114 to 117, a control information insertion unit 118, framers 119 to 122, and E/O conversion units 123 to 126. Although not shown in FIG. 5, the SONET transmission equipment 73 further comprises a TDM (Time Division Multiplex) demultiplexing unit which receives SONET frames, and demultiplexes the SONET frames into virtual tributaries and other overhead information.

The input buffers 100 to 103 temporarily store the virtual tributaries of the received SONET frames, and respectively supply the temporarily stored virtual tributaries to the POH termination units 104 to 107. The POH termination units 104 to 107 extracts POHs (path overheads) each including control information from the virtual tributaries supplied from the input buffers 100 to 103, under control of the control information extraction unit 108, and supply the extracted POHs to the control information extraction unit 108 and data portions of the SONET frames to the path switch unit 109. The control information extraction unit 108 receives the POHs extracted by the POH termination units 104 to 107, extracts the control information from the POHs, and supplies the control information and the other portions of the POHs to the data storage control unit 111 and the controller 112.

The path switch unit 109 switches the data portions of the SONET frames under control of the data storage control unit 111 or the controller 112. The hard disk unit 110 stores data supplied from the path switch unit 109, and supplies data stored in the hard disk unit 110 to the path selection unit 113, under control of the data storage control unit 111 or the controller 112. The data storage control unit 111 controls the operations of storing data in the hard disk unit 110 and reading data from the hard disk unit 110. The controller 112 monitors and controls the entire SONET transmission equipment and flows of data in the SONET transmission equipment. The path selection unit 113 selects paths of data under control of the data storage control unit 111 or the controller 112.

The POH insertion units 114 to 117 insert POHs in virtual tributaries containing the data portions output from the path selection unit 113, respectively, under control of the control information insertion unit 118. The control information insertion unit 118 controls the POH insertion units 114 to 117 so that control information is included in the POHs inserted in the virtual tributaries. The framers 119 to 122 produce SONET frames containing the virtual tributaries output from the POH insertion units 114 to 117, respectively. The E/O conversion units 123 to 126 generate optical signals conveying the SONET frames produced by the framers 119 to 122, by electrical-to-optical conversion.

Referring back to FIG. 2, each of the clients 77 to 79 sends to the contents server 70 a request for transmission of image data (or sound data), receives the image data (or sound data), and displays an image represented by the received image data on a display device (not shown) or outputs sound data by a speaker (not shown).

(4) Operations of First Embodiment

The operations of the first embodiment are explained below.

First, the operations of the data transmission system of FIG. 2 in response to a request for storage are explained below.

When the aforementioned information provider sends to the contents server 70 a request for transmission of data (e.g., image data) to the SONET transmission equipment 73 and storage of the data in the SONET transmission equipment 73, the contents server 70 supplies the data which is designated to be stored, to the transformation equipment 71 through an input port which is predetermined to be used when data designated to be stored is input into the transformation equipment 71. In the example of FIG. 3, the data supplied from the contents server 70 is input into the transformation equipment 71 through the input port 71b. In addition, the contents server 70 supplies control information to the transformation equipment 71. At this time, the control information includes information items Nos. 1, 6, 7, 8, 9, and 10 illustrated in FIG. 6.

FIG. 6 shows examples of information items which can be included in control information. The information item No. 1 is a data storage request, which is a request for storage of object data in a storage medium, the information item No. 6 is a data ID, which designates the object data, the information item No. 7 is data amount information, which indicates the size of the object data, the information item No. 8 is data position information, which indicates the position of the object data in a main signal, the information item No. 9 is destination information, which indicates a destination of the object data, and the information item No. 10 is source information, which indicates a source of the object data.

In addition, the information item No. 2 is a data readout request, which is a request for readout of object data from a storage medium, the information item No. 3 is a data erasing request, which is a request for erasing of object data in a storage medium, the information item No. 4 is a data lock request, which is a request for locking (i.e., protection against erasing) of the object data stored in a storage medium, and the information item No. 5 is a data unlock request, which is a request for unlocking (removal of protection against erasing) of object data stored in a storage medium. Further, the information item No. 11 is reserved for future extension.

When the transformation equipment 71 receives the control information as above, the control information extraction circuit 71e extracts the control information, and supplies the control information to the transformation circuit 71d. The transformation circuit 71d transforms the data (e.g., image data) into SONET frames. At this time, the transformation circuit 71d inserts the control information supplied from the control information extraction circuit 71e, in predetermined fields of POHs in virtual tributaries which contain the data.

Figure 7:
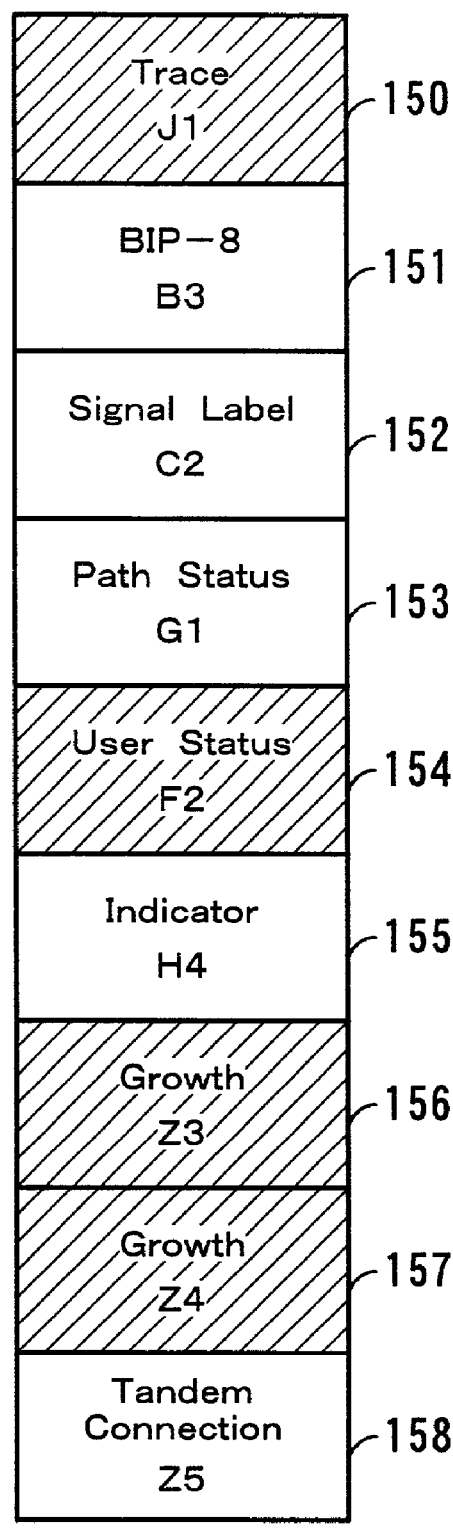
FIG. 7 shows the fields (bytes) in a POH in a virtual tributary.

FIG. 7 shows the fields (bytes) in a POH in a virtual tributary. The control information extraction circuit 71e inserts the data ID (the information item No. 6) of 4 bits and the data amount information (the information item No. 7) of 4 bits in the J1 byte 150 in the POH, the data storage request (the information item No. 1) of 2 bits in the F2 byte 154 in the POH, the source information (the information item No. 10) of 1 byte in the Z3 byte 156 in the POH, and the destination information (the information item No. 9) of 1 byte in the Z4 byte 157 in the POH.

The SONET frames generated as above are converted into optical signals in the output port 71f, and transmitted to the SONET transmission equipment 72. The SONET transmission equipment 72 cross-connects the optical signals according to the control information, and transfers the optical signals to the SONET transmission equipment 73, which is indicated in the control information as the destination. When the SONET transmission equipment 73 receives the optical signals, the optical signals are converted into electric signals, and are then supplied to an input buffer in the SONET transmission equipment 73 (e.g., input buffer 100 illustrated in FIG. 5). For example, the input buffer 100 temporarily stores virtual tributaries of the received SONET frames, and supplies the temporarily stored virtual tributaries to the POH termination unit 104. The POH termination unit 104 extracts the POHs including the control information from the virtual tributaries supplied from the input buffer 100, under control of the control information extraction unit 108, and supplies the extracted POHs to the control information extraction unit 108. The control information extraction unit 108 receives the POHs extracted by the POH termination unit 104, extracts the control information from the POHs, and supplies the control information to the data storage control unit 111.

In this example, the data storage request is included in the control information. Therefore, the data storage control unit 111 controls the path switch unit 109 so that the data (e.g., image data) supplied from the POH termination unit 104 is supplied to the hard disk unit 110 and stored in an area of the hard disk. At this time, the data ID, the data amount information, and storage area information which indicates the area in which the data is stored and registered so that the data ID, the data amount information, and the storage area information are associated with each other.

Thus, the data stored in the contents server 70 can be transferred to the SONET transmission equipment 73 and stored in the hard disk unit 110 in the SONET transmission equipment 73.

Next, the operations of the data transmission system of FIG. 2 in response to a request for download of data which is sent from a client are explained below.

When the client 77 sends to the contents server 70 a request for download of data (e.g., image data), the request is transferred to the controller 112 in the SONET transmission equipment 72. When the controller 112 in the SONET transmission equipment 72 receives the request, the controller 112 generates a virtual tributary addressed to the SONET transmission equipment 73, and inserts a data ID of data to be read out and data amount information in the J1 byte 150, a data readout request in the F2 byte 154, source information in the Z3 byte 156, and destination information in the Z4 byte 157, in the POH of the virtual tributary. Then, the SONET transmission equipment 72 transmits a SONET frame containing the virtual tributary to the SONET transmission equipment 73.

When the SONET transmission equipment 73 receives the SONET frame, the virtual tributary is supplied to, for example, the POH termination unit 104 through the input buffer 100. The POH termination unit 104 extracts the POH including the control information from the virtual tributary supplied from the input buffer 100, under control of the control information extraction unit 108, and supplies the extracted POH to the control information extraction unit 108. The control information extraction unit 108 receives the POH extracted by the POH termination unit 104, extracts the control information from the POH, and supplies the control information to the data storage control unit 111.

Then, the data storage control unit 111 detects the data readout request and the data ID included in the control information, and controls the hard disk unit 110 so that the data corresponding to the data ID is read out from the hard disk unit 110, and also controls the path selection unit 113 so that the path selection unit 113 selects the data read out from the hard disk unit 110. In addition, the path selection unit 113 supplies destination information (the information item No. 9) to the control information insertion unit 118. Thus, the data read out from the hard disk unit 110 is selected by the path selection unit 113, and supplied to, for example, the POH insertion unit 114. On the other hand, the POH insertion unit 114 inserts POHs in virtual tributaries containing the data read out from the hard disk unit 110 and selected by the path selection unit 113, under control of the control information insertion unit 118, where the destination information is inserted in the Z4 byte 157 in each POH. Then, the virtual tributaries are supplied to, for example, the framer 119, which produces SONET frames containing the virtual tributaries output from the POH insertion unit 114. The E/O conversion unit 123 generates an optical signal conveying the SONET frames produced by the framer 119, by electrical-to-optical conversion.

Thus, the optical signal generated as above is transmitted from the SONET transmission equipment 73 to the transformation equipment 76, and received by the transformation equipment 76 through, for example, the input port 76*a*. The control information extraction circuit 76*c* in the transformation equipment 76 extracts the control information included in the POH in each virtual tributary, and supplies the POH to the transformation circuit 76*b*. The transformation circuit 76*b* transforms the received SONET frames into IP packets. At this time, the destination information included in the POHs in the received SONET frames is inserted in the headers of the IP packets. Then, the IP packets are supplied to the output port 76*d* which is connected to the client 77, and transmitted to the client 77. At this time, the transmission rate can be arbitrarily determined according to the transmission line between the transformation equipment 76 and the client 77.

Thus, the data stored in the hard disk unit 110 can be read out, and transmitted to the client 77. When a request for readout of data is sent from the client 78 or 79 to the contents server 70, the data can be read out and transmitted to the client 78 or 79 in a similar manner. Further, when the multicast technique is used, identical data can be concurrently transmitted to the clients 77 to 79.

As described above, data supplied from the contents server 70 is temporarily stored in the hard disk unit 110 in the SONET transmission equipment 73, and is thereafter transmitted to a client in response to a request from the client. Therefore, the transmission lines from the contents server 70 to the SONET transmission equipment 73 are not used during the transmission of data from the SONET transmission equipment 73 to the client. Thus, the data can be transmitted from the SONET transmission equipment 73 to the client without affecting the traffic in the transmission lines from the contents server 70 to the SONET transmission equipment 73.

In addition, the data can be transmitted from the SONET transmission equipment 73 to the client at a transmission rate of the transmission line between the SONET transmission equipment 73 and the client. That is, the data can be transmitted to the client at a transmission rate which is optimum for the client.

When data stored in the hard disk unit 110 becomes unnecessary, the information provider sends to the transformation equipment 71 a request for erasing of the data. When the transformation equipment 71 receives the request for erasing, the transformation equipment 71 inserts a data erasing request in the F2 byte 154 and a data ID of the data and data amount information in the J1 byte 150, in a POH, and sends a SONET frame containing the POH to the SONET transmission equipment 73 through the SONET transmission equipment 72. Then, the SONET transmission equipment 73 detects the data erasing request, the data ID, and the data amount information, and erases the data in the hard disk unit 110.

On the other hand, it is possible to lock data stored in the hard disk unit 110 so that the data stored in the hard disk unit 110 is protected against unintended erasing of the data. In order to realize the protected against erasing, the transformation equipment 71 inserts a data lock request in the F2 byte 154 and a data ID of the data and data amount information in the J1 byte 150, in a POH, and sends a SONET frame containing the POH to the SONET transmission equipment 73 through the SONET transmission equipment 72. Then, the SONET transmission equipment 73 detects the data lock request, the data ID, and the data amount information, and locks the data in the hard disk unit 110.

Further, it is possible to unlock (i.e., remove protection against erasing of) data stored in the hard disk unit 110. In order to unlock data, the transformation equipment 71 inserts a data unlock request in the F2 byte 154 and a data ID of the data and data amount information in the J1 byte 150, in a POH, and sends a SONET frame containing the POH to the SONET transmission equipment 73 through the SONET transmission equipment 72. Then, the SONET transmission equipment 73 detects the data unlock request, the data ID, and the data amount information, and unlocks the data in the hard disk unit 110.

(5) Operation Flows

The operations of the data transmission system of FIG. 2 can be realized in accordance with the following operation flows of the transformation equipment 71, the SONET transmission equipment 72, and the SONET transmission equipment 73, which are explained below with reference to FIGS. 8 to 15.

Figure 8:
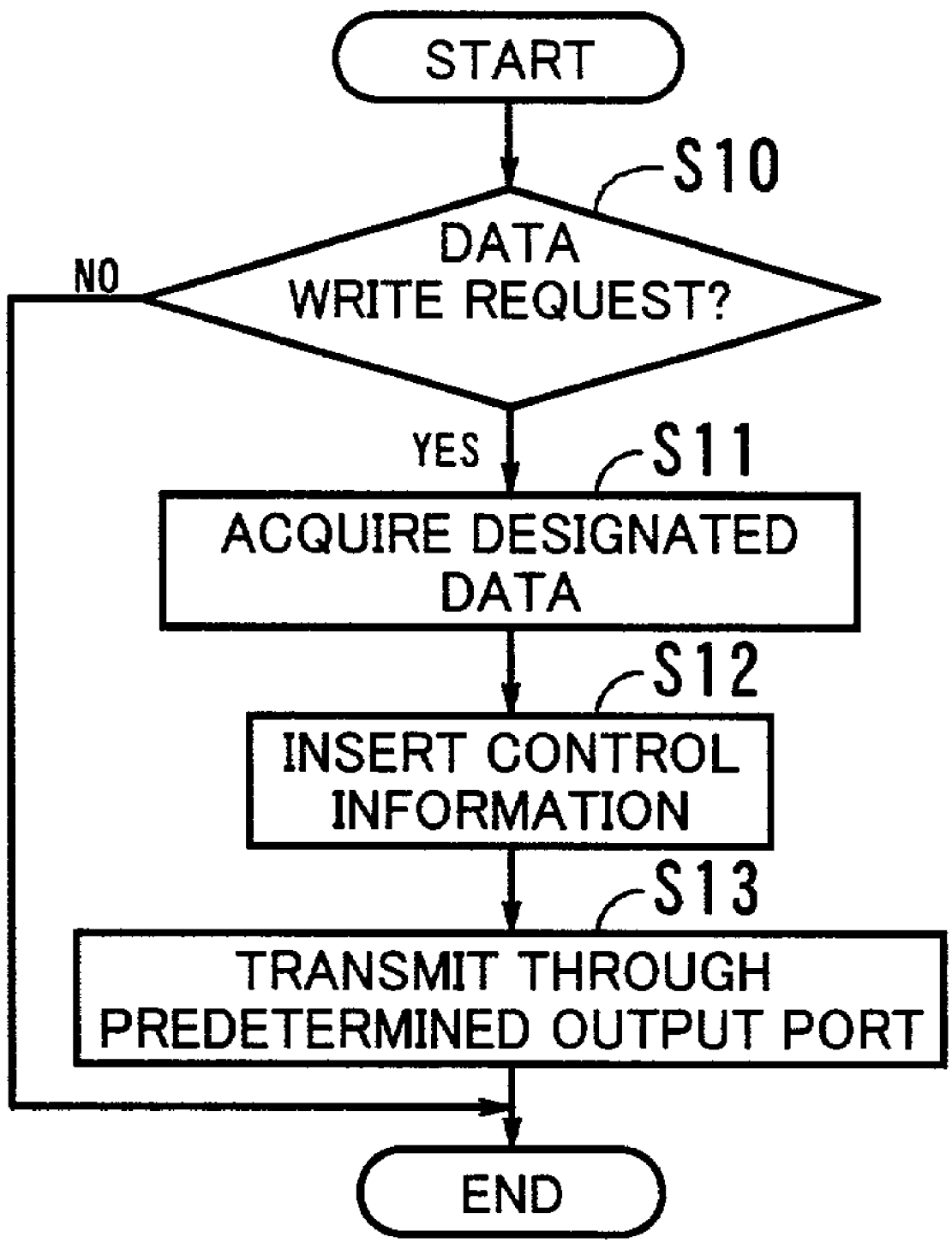
FIG. 8 is a flow diagram indicating an example of a sequence of operations performed by the transformation equipment 71.

FIG. 8 is a flow diagram indicating an example of a sequence of operations performed by the transformation equipment 71.

In step S10, the control information extraction circuit 71*e* determines whether or not the SONET transmission equipment 72 receive a data storage request from the contents server 70. When yes is determined in step S10, the operation goes to step S11. When no is determined in step S10, the sequence of FIG. 8 is completed.

In step S11, the transformation circuit 71*d* acquires data which is requested to be stored in the hard disk unit 110, from the input port 71*b*.

In step S12, the transformation circuit 71*d* inserts in a POH control information supplied from the control information extraction circuit 71*e*.

In step S13, the transformation circuit 71*d* transmits the data with the POH through the predetermined output port 71*f*.

Figure 9:
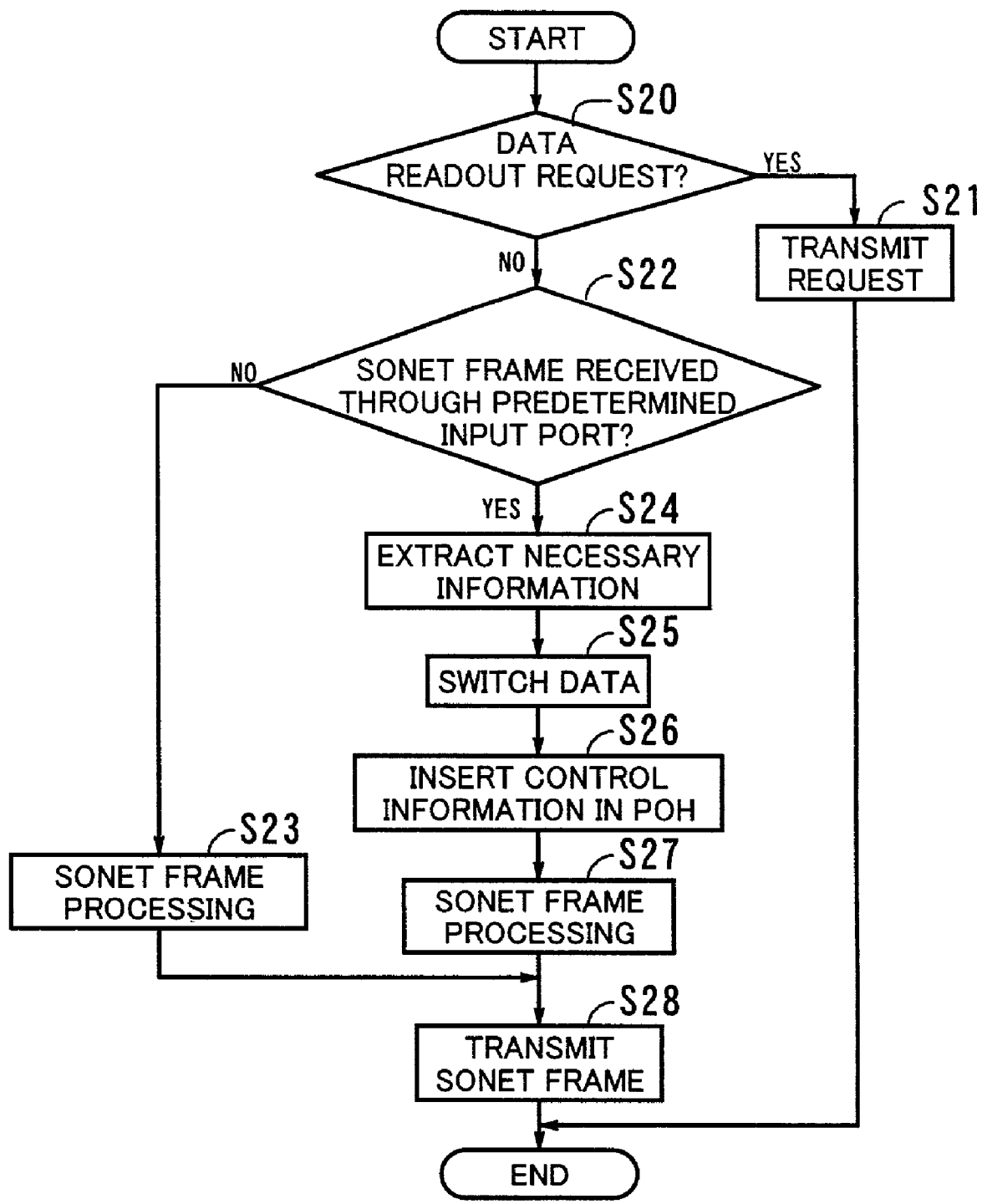
FIG. 9 is a flow diagram indicating an example of a sequence of operations performed by the SONET transmission equipment 72.

FIG. 9 is a flow diagram indicating an example of a sequence of operations performed by the SONET transmission equipment 72.

In step S20, the control information extraction unit 108 extracts control information from a POH in a received SONET frame, refers to the control information, and determines whether or not the control information includes storage control information (i.e., one of a data storage request, a data readout request, a data erasing request, a data lock request, and a data unlock request). When yes is determined in step S20, the operation goes to step S21. When no is determined in step S20, the operation goes to step S22.

In step S21, the controller 112 controls the control information insertion unit 118 so that the control information insertion unit 118 inserts the extracted control information in a POH, and a SONET frame including the POH is transmitted to a destination of the request included in the control information.

In step S22, the controller 112 determines whether or not the SONET transmission equipment 72 has received the SONET frame through a predetermined input port. When yes is determined in step S22, the operation goes to step S24. When no is determined in step S22, the operation goes to step S23.

In step S23, the controller 112 executes the normal SONET frame processing.

In step S24, the control information extraction unit 108 extracts from the extracted control information necessary information including destination information.

In step S25, the controller 112 controls the path switch unit 109 and the path selection unit 113 based on the destination information, and controls the corresponding input buffer so that data portions of SONET frame stored in the input buffer are supplied to the path switch unit 109 through the corresponding POH termination unit.

In step S26, the controller 112 controls the control information insertion unit 118 so that control information is inserted in a POH.

In step S27, the corresponding framer produce a SONET frame containing the data portions output from the corresponding POH insertion unit.

In step S28, the corresponding E/O conversion unit generates an optical signal conveying the SONET frame produced by the framer, by electrical-to-optical conversion, and transmits the optical signal.

Figure 10:
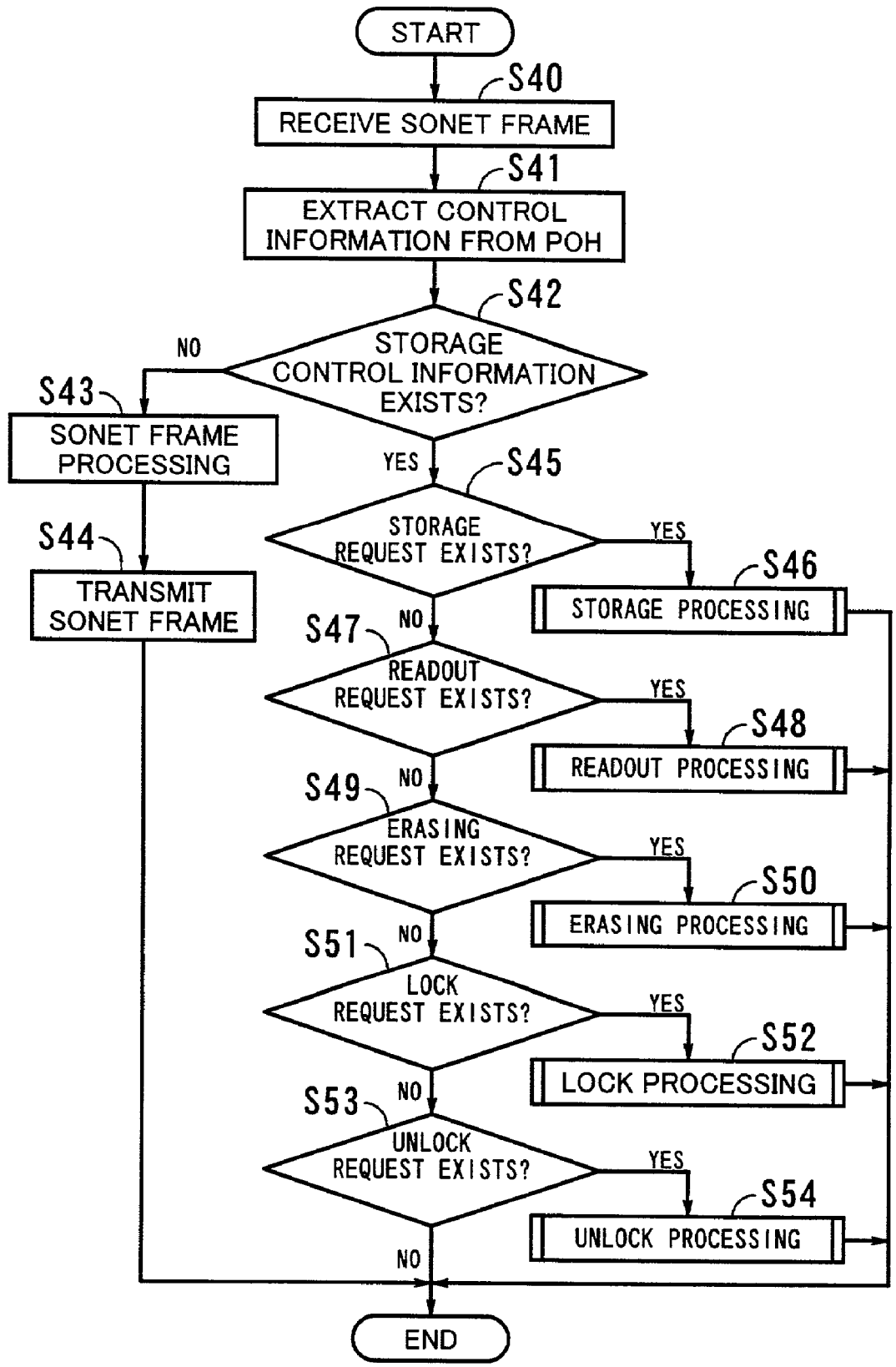
FIG. 10 is a flow diagram indicating an example of a sequence of operations performed by the SONET transmission equipment 73.

FIG. 10 is a flow diagram indicating an example of a sequence of operations performed by the SONET transmission equipment 73.

In step S40, the SONET transmission equipment 73 receives a SONET frame, and virtual tributaries contained in the SONET frame are input into one of the input buffers.

In step S41, the control information extraction unit 108 extracts control information from a POH in each of the virtual tributaries.

In step S42, the control information extraction unit 108 determines whether or not the control information extracted in step S41 includes storage control information (i.e., one of a data storage request, a data readout request, a data erasing request, a data lock request, and a data unlock request). When yes is determined in step S42, the operation goes to step S45. When no is determined in step S42, the operation goes to step S43.

In step S43, the controller 112 executes the normal SONET frame processing.

In step S44, the corresponding E/O conversion unit transmits a SONET frame produced by the normal SONET frame processing in step S43.

In step S45, the data storage control unit 111 determines whether or not the storage control information extracted by the control information extraction unit 108 is a data storage request. When yes is determined in step S45, the operation goes to step S46. When no is determined in step S45, the operation goes to step S47.

In step S46, the data storage control unit 111 executes data storage processing, which is explained later.

In step S47, the data storage control unit 111 determines whether or not the storage control information extracted by the control information extraction unit 108 is a data readout request. When yes is determined in step S47, the operation goes to step S48. When no is determined in step S47, the operation goes to step S49.

In step S48, the data storage control unit 111 executes data readout processing, which is explained later.

In step S49, the data storage control unit 111 determines whether or not the storage control information extracted by the control information extraction unit 108 is a data erasing request. When yes is determined in step S49, the operation goes to step S50. When no is determined in step S49, the operation goes to step S51.

In step S50, the data storage control unit 111 executes data erasing processing, which is explained later.

In step S51, the data storage control unit 111 determines whether or not the storage control information extracted by the control information extraction unit 108 is a data lock request. When yes is determined in step S51, the operation goes to step S52. When no is determined in step S51, the operation goes to step S53.

In step S52, the data storage control unit 111 executes data lock processing, which is explained later.

In step S53, the data storage control unit 111 determines whether or not the storage control information extracted by the control information extraction unit 108 is a data unlock request. When yes is determined in step S53, the operation goes to step S54. When no is determined in step S53, the sequence of FIG. 10 is completed.

In step S54, the data storage control unit 111 executes data unlock processing, which is explained later.

Figure 11:
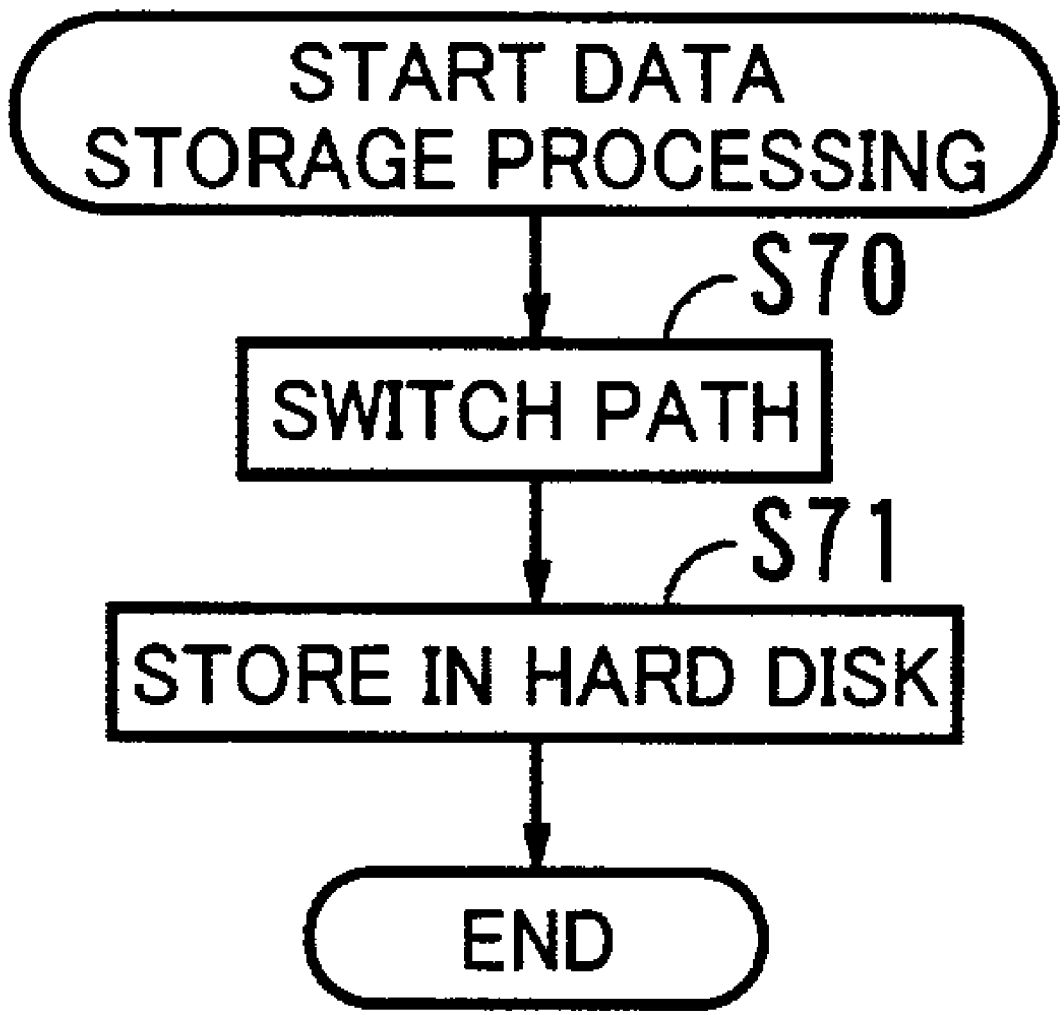
FIG. 11 is a flow diagram indicating details of the data storage processing in step S46 in FIG. 10.

FIG. 11 is a flow diagram indicating details of the data storage processing in step S46 in FIG. 10.

In step S70, the data storage control unit 111 controls the path switch unit 109 so that the corresponding path in the path switch unit 109 is switched and data contained in the virtual tributary is supplied to the hard disk unit 110.

In step S71, the hard disk unit 110 stores the data supplied through the path switch unit 109.

Figure 12:
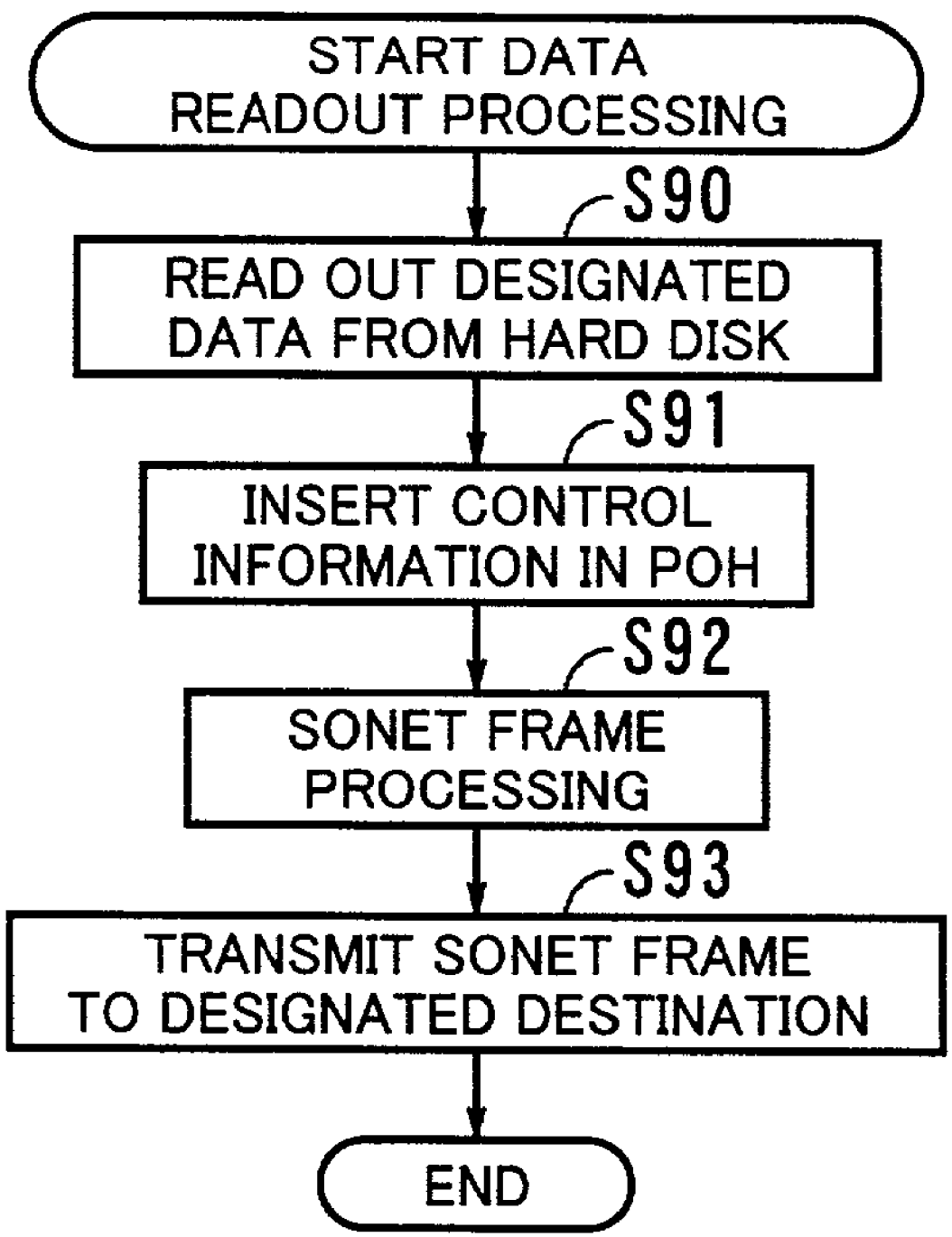
FIG. 12 is a flow diagram indicating details of the data readout processing in step S48 in FIG. 10.

FIG. 12 is a flow diagram indicating details of the data readout processing in step S48 in FIG. 10.

In step S90, the data storage control unit 111 reads out from the hard disk unit 110 data which is designated by the control information.

In step S91, the data storage control unit 111 controls the path selection unit 113 so as to supply the data read out from the hard disk unit 110, to one of the POH insertion units corresponding to source information included in the control information. Then, the the POH insertion unit inserts control information in a POH in each virtual tributary.

In step S92, the framer corresponding to the POH insertion unit executes processing for generating a SONET frame which contains the virtual tributary.

In step S93, the E/O conversion unit corresponding to the above framer generates an optical signal conveying the SONET frame produced by the framer, by electrical-to-optical conversion, and transmits the optical signal.

Figure 13:
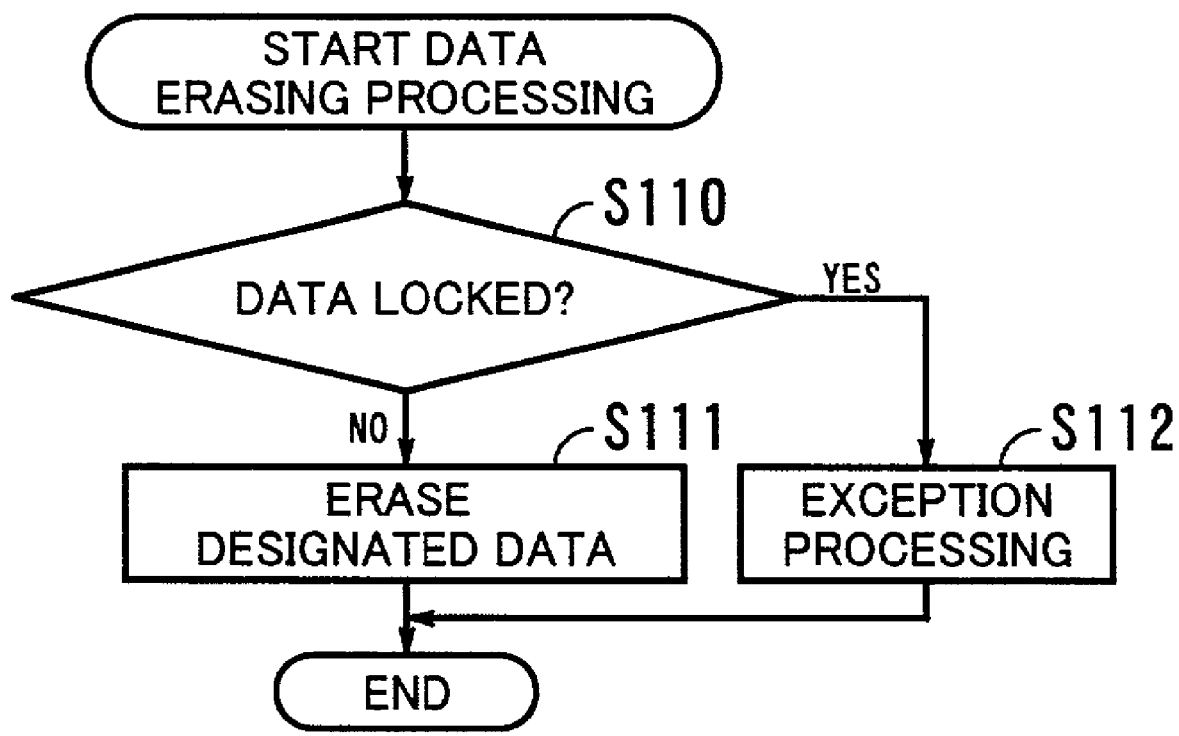
FIG. 13 is a flow diagram indicating details of the data erasing processing in step S50 in FIG. 10.

FIG. 13 is a flow diagram indicating details of the data erasing processing in step S50 in FIG. 10.

In step S110, the data storage control unit 111 searches the hard disk unit 110, and determines whether or not data corresponding to a data ID included in the control information is locked. When yes is determined in step S110, the operation goes to step S112. When no is determined in step S110, the operation goes to step S111.

In step S111, the data storage control unit 111 erases the data in the hard disk unit 110.

In step S112, the data storage control unit 111 executes exception processing since the SONET transmission equipment 73 is requested to erase the locked data.

Figure 14:
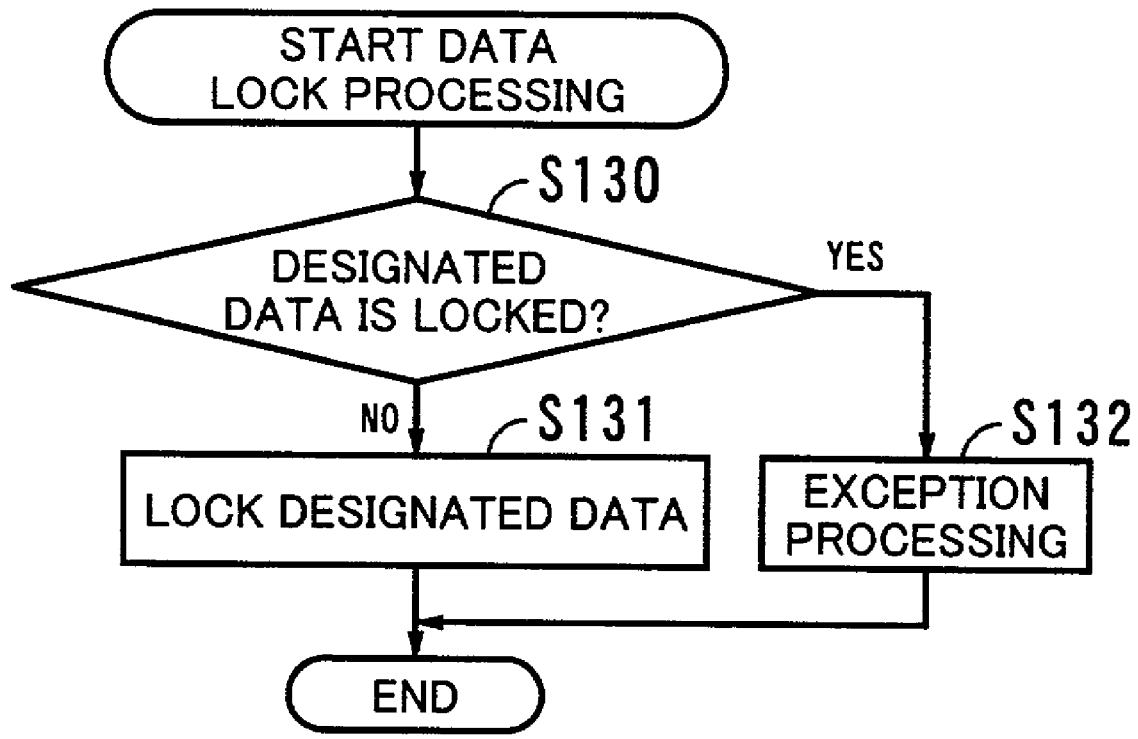
FIG. 14 is a flow diagram indicating details of the data lock processing in step S52 in FIG. 10.

FIG. 14 is a flow diagram indicating details of the data lock processing in step S52 in FIG. 10.

In step S130, the data storage control unit 111 searches the hard disk unit 110, and determines whether or not data corresponding to a data ID included in the control information is locked. When yes is determined in step S130, the operation goes to step S132. When no is determined in step S130, the operation goes to step S131.

In step S131, the data storage control unit 111 locks the data in the hard disk unit 110 so that the data cannot be erased. For example, in a typical storage system, each data item is locked and unlocked by setting a predetermined bit in a data management table in a hard disk unit to ON or OFF, respectively. That is, the data can be locked by setting the predetermined bit to ON.

In step S132, the data storage control unit 111 executes exception processing since the SONET transmission equipment 73 is requested to lock the already locked data.

Figure 15:
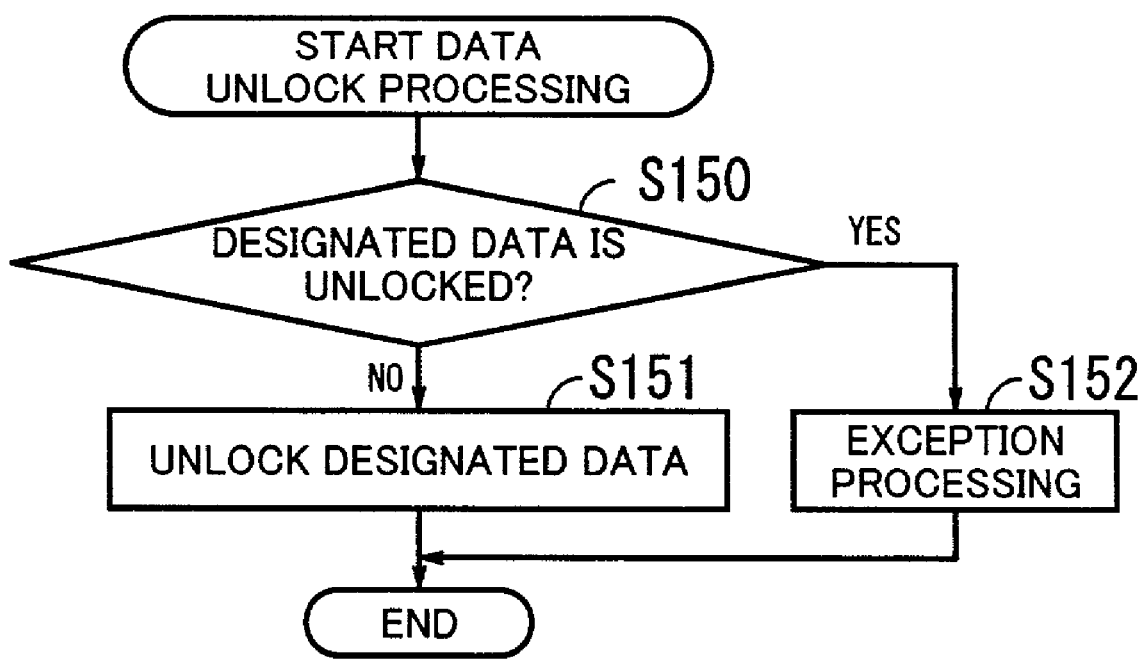
FIG. 15 is a flow diagram indicating details of the data unlock processing in step S54 in FIG. 10.

FIG. 15 is a flow diagram indicating details of the data unlock processing in step S54 in FIG. 10.

In step S150, the data storage control unit 111 searches the hard disk unit 110, and determines whether or not data corresponding to a data ID included in the control information is locked. When yes is determined in step S150, the operation goes to step S152. When no is determined in step S150, the operation goes to step S151.

In step S151, the data storage control unit 111 unlocks the data in the hard disk unit 110 so that the data can be erased.

In step S152, the data storage control unit 111 executes exception processing since the SONET transmission equipment 73 is requested to unlock the already unlocked data.

(6) Other Embodiments

Figure 16:
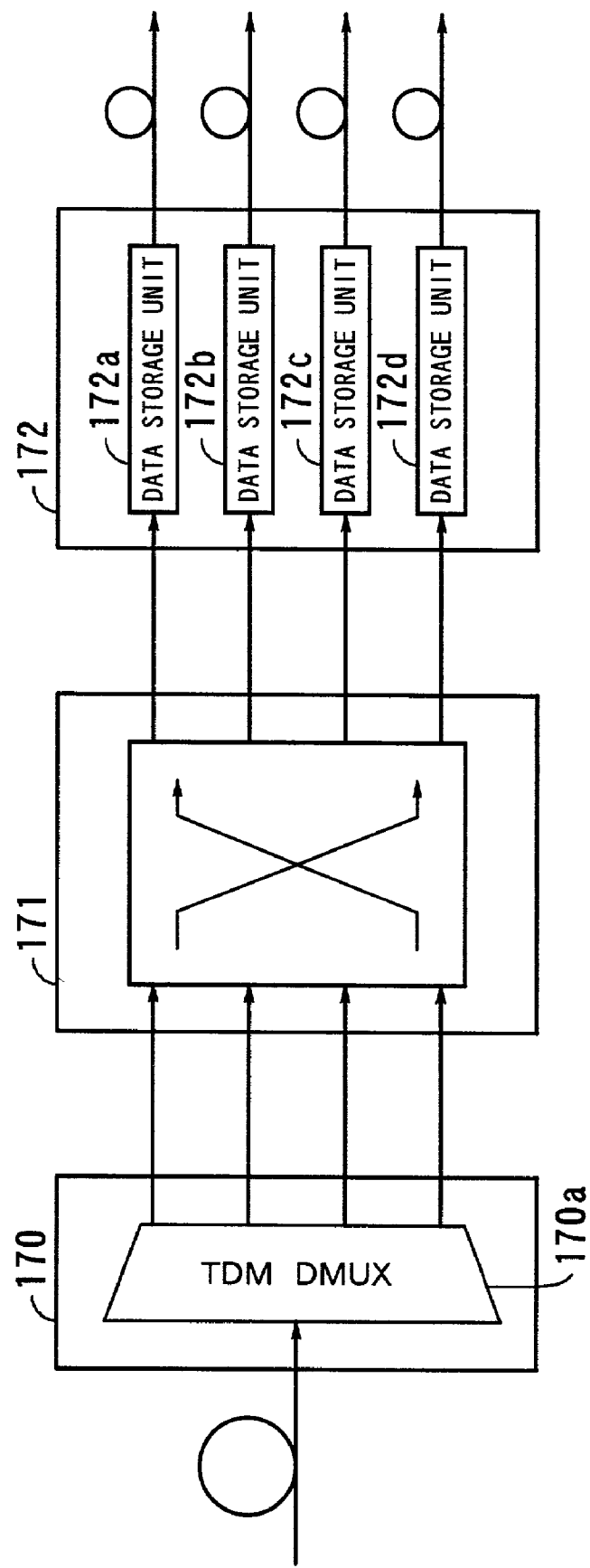
FIG. 16 is a diagram illustrating an outline of a construction of a SONET transmission equipment used in a second embodiment of the present invention.

FIG. 16 is a diagram illustrating an outline of a construction of a SONET transmission equipment used in the second embodiment of the present invention. In FIG. 16, reference numeral 170 denotes a first interface module, 171 denotes a switch module, and 172 denotes a second interface module.

The first interface module 170 in FIG. 16 contains a TDM demultiplexing unit 170a, which receives SONET frames, and demultiplexes the SONET frames into virtual tributaries and other overhead information. In addition, although not shown in FIG. 16, the first interface module 170 contains the input buffers 100 to 103, the POH termination units 104 to 107, and the control information extraction unit 108 in FIG. 5. The switch module 171 in FIG. 16 contains the path switch unit 109, the data storage control unit 111, the controller 112, and the path selection unit 113 in FIG. 5. The second interface module 172 in FIG. 16 contains the POH insertion units 114 to 117, the control information insertion unit 118, the framers 119 to 122, and the E/O conversion units 123 to 126 in FIG. 5. In addition, the second interface module 172 includes a plurality of data storage units 172a to 172d, which are provided corresponding to the plurality of SONET transmission lines, respectively, instead of the common hard disk unit 110 in FIG. 5. The SONET transmission equipment having the construction of FIG. 16 can achieve the substantially the same functions as those of the SONET transmission equipment of FIG. 5.

Figure 17:
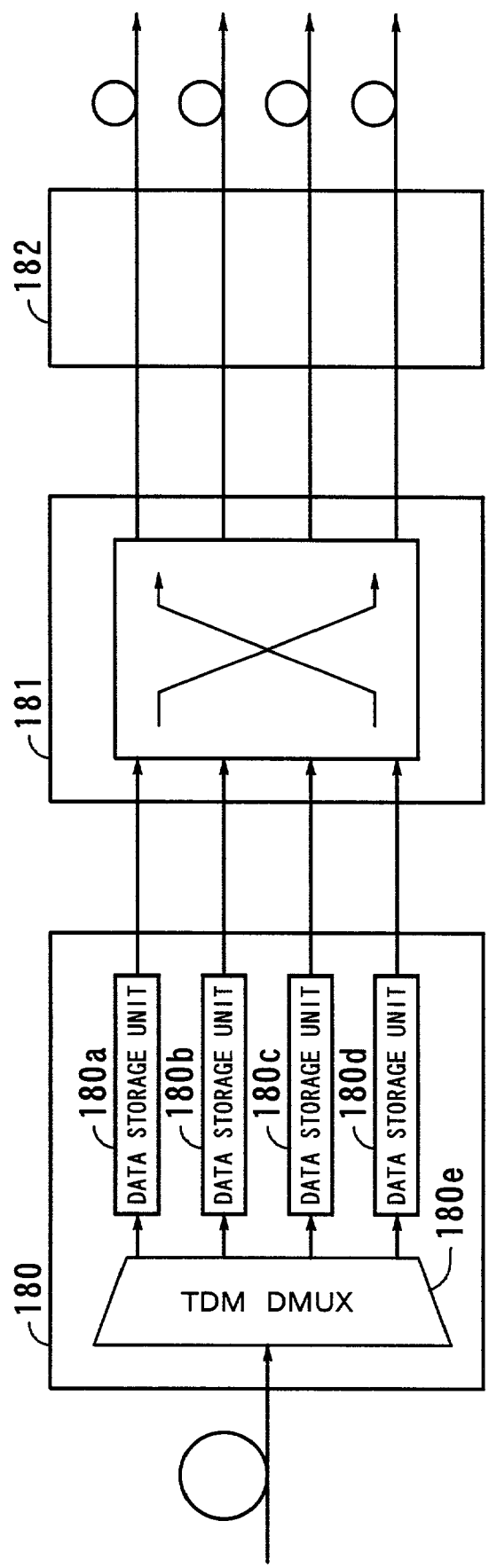
FIG. 17 is a diagram illustrating an outline of a construction of a SONET transmission equipment used in a third embodiment of the present invention.

FIG. 17 is a diagram illustrating an outline of a construction of a SONET transmission equipment used in the third embodiment of the present invention. In FIG. 17, reference numeral 180 denotes a first interface module, 181 denotes a switch module, and 182 denotes a second interface module.

The first interface module 180 in FIG. 17 contains a TDM demultiplexing unit 180e, which receives SONET frames, and demultiplexes the SONET frames into virtual tributaries and other overhead information. In addition, although not shown in FIG. 17, the first interface module 180 in FIG. 17 contains the input buffers 100 to 103, the POH termination units 104 to 107, and the control information extraction unit 108 in FIG. 5. The switch module 181 in FIG. 17 contains the path switch unit 109, the data storage control unit 111, the controller 112, and the path selection unit 113 in FIG. 5. The second interface module 182 in FIG. 17 contains the POH insertion units 114 to 117, the control information insertion unit 118, the framers 119 to 122, and the E/O conversion units 123 to 126 in FIG. 5. In addition, the first interface module 180 includes a plurality of data storage units 180a to 180d, which are provided corresponding to the plurality of SONET transmission lines, respectively, instead of the common hard disk unit 110 in FIG. 5. The SONET transmission equipment having the construction of FIG. 17 can also achieve the substantially the same functions as those of the SONET transmission equipment of FIG. 5.

Figure 18:
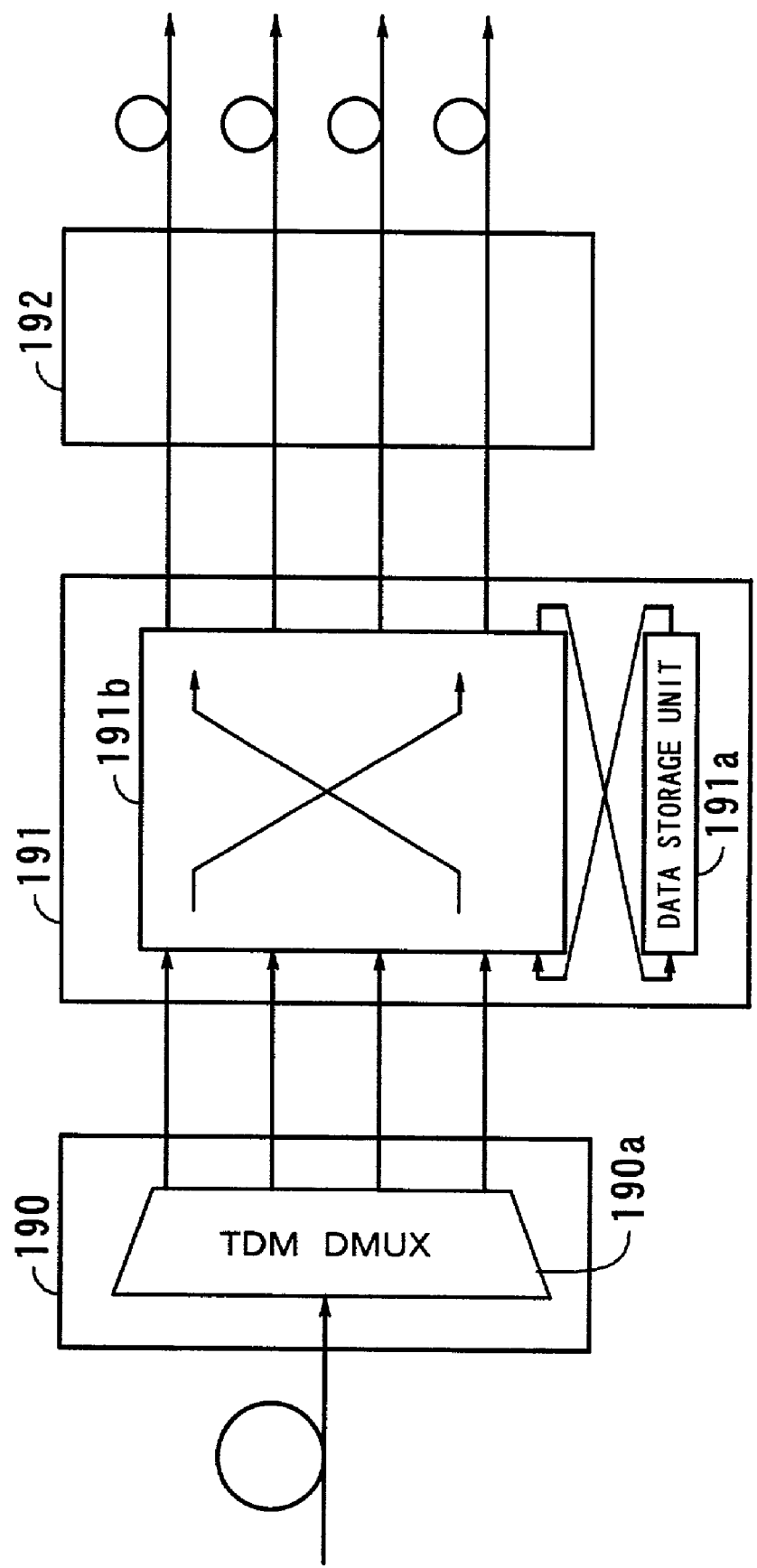
FIG. 18 is a diagram illustrating an outline of a construction of a SONET transmission equipment used in a fourth embodiment of the present invention.

FIG. 18 is a diagram illustrating an outline of a construction of a SONET transmission equipment used in the fourth embodiment of the present invention. In FIG. 18, reference numeral 190 denotes a first interface module, 191 denotes a switch module, and 192 denotes a second interface module.

The first interface module 190 in FIG. 18 contains the input buffers 100 to 103, the POH termination units 104 to 107, and the control information extraction unit 108 in FIG. 5. The switch module 191 in FIG. 18 contains the path switch unit 109, the data storage control unit 111, the controller 112, and the path selection unit 113 in FIG. 5. The second interface module 192 in FIG. 18 contains the POH insertion units 114 to 117, the control information insertion unit 118, the framers 119 to 122, and the E/O conversion units 123 to 126 in FIG. 5. In addition, the switch module 191 includes a data storage unit 191a and a switch unit 191b. The switch unit 191b corresponds to the path switch unit 109 and the path selection unit 113 in FIG. 5.

Although the data storage unit 191a is provided corresponding to the hard disk unit 110 in FIG. 5, data are exchanged between the data storage unit 191a and the switch unit 191b as follows. When the SONET transmission equipment receives a data storage request, received data is supplied to the data storage unit 191a through the first interface module 190 and the switch module 191, and stored in the data storage unit 191a. In addition, when the SONET transmission equipment receives a data readout request, data stored in the data storage unit 191a is read out from the data storage unit 191a, and supplied to the input side of the switch unit 191b. The SONET transmission equipment having the construction of FIG. 18 can also achieve the substantially the same functions as those of the SONET transmission equipment of FIG. 5.

Figure 19:
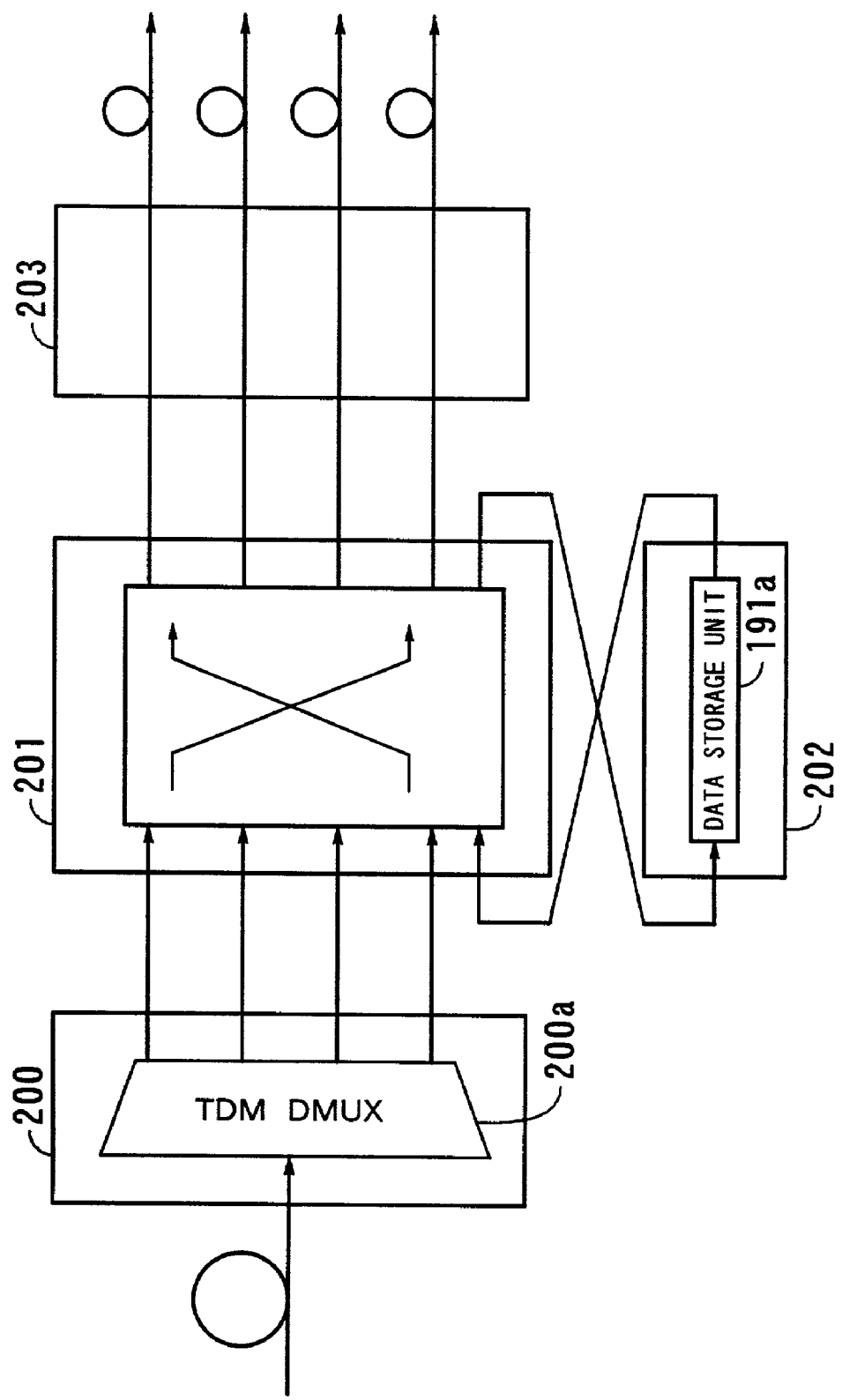
FIG. 19 is a diagram illustrating an outline of a construction of a SONET transmission equipment used in a fifth embodiment of the present invention.
Figure 20:
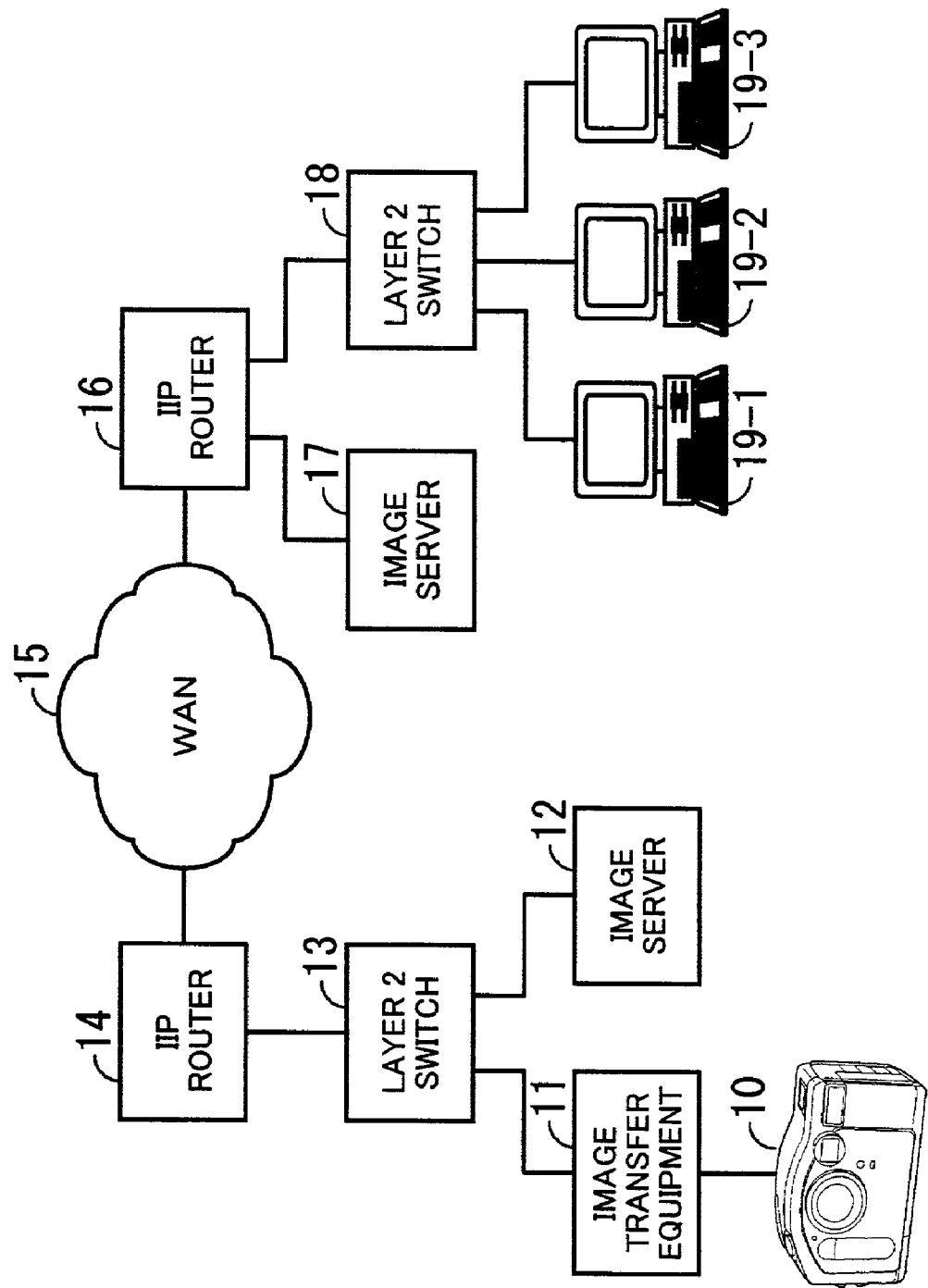
FIG. 20 is a diagram illustrating an example of a conventional image delivery or cable television system which uses the Internet.
Figure 21:
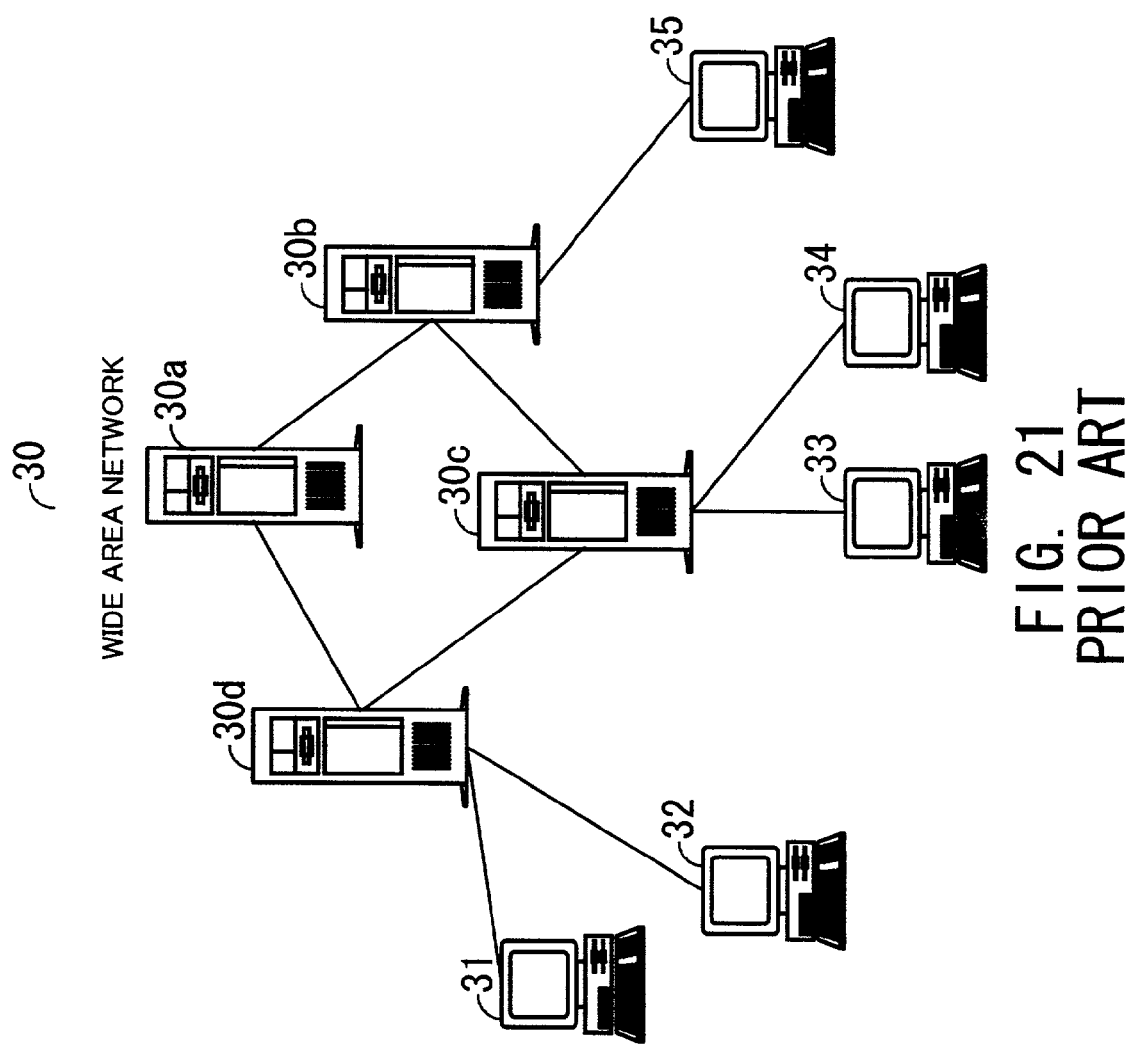
FIG. 21 is a diagram illustrating an example of a configuration of cache servers in the Internet.
Figure 22:
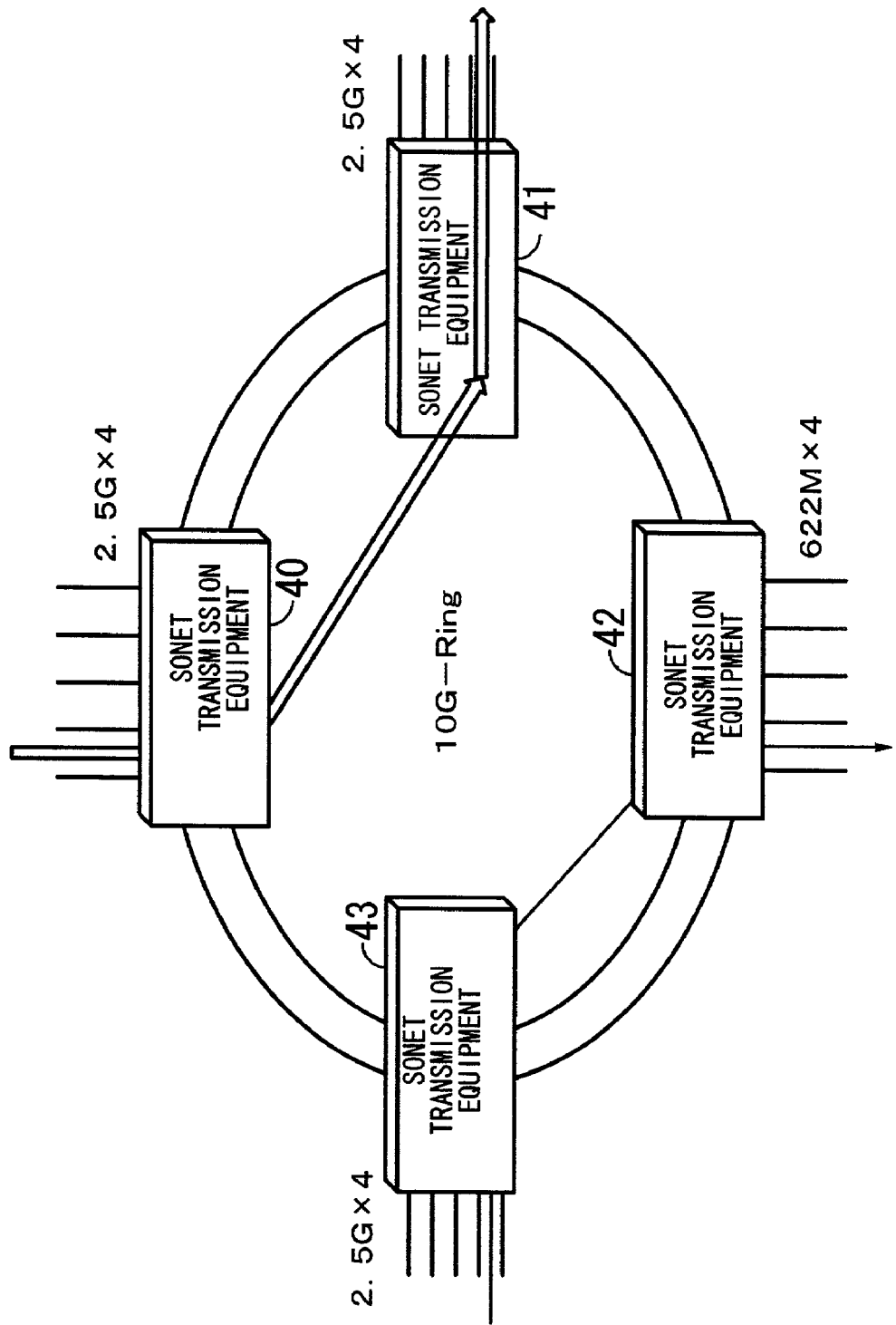
FIG. 22 is a diagram for explaining the bandwidths of incoming lines and corresponding outgoing lines.
Figure 23:
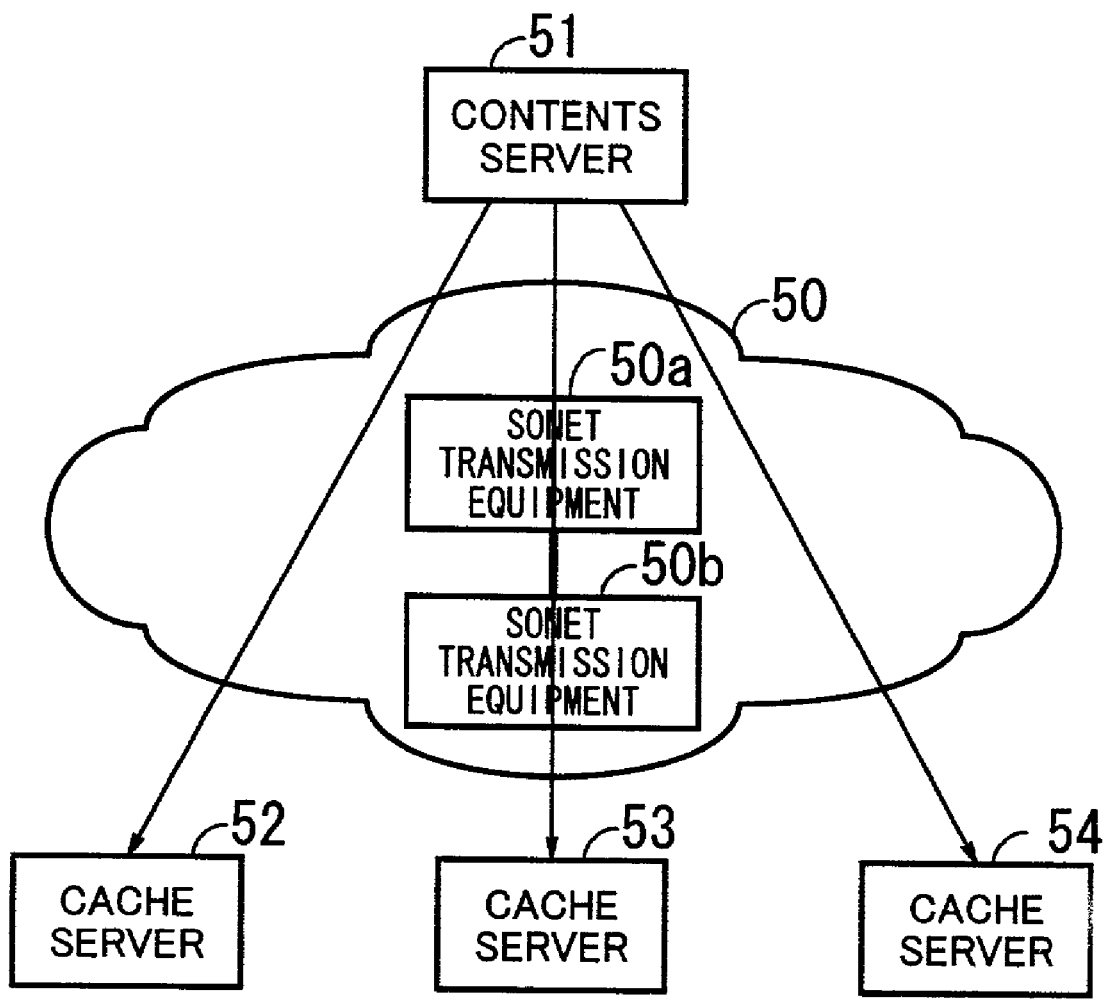
FIG. 23 is a diagram illustrating an example of a configuration for transmitting data from a data source server to a plurality of cache servers in a conventional data delivery service system.

FIG. 19 is a diagram illustrating an outline of a construction of a SONET transmission equipment used in the fifth embodiment of the present invention. In FIG. 19, reference numeral 200 denotes a first interface module, 201 denotes a switch module, 202 denotes a data storage module, and 203 denotes a second interface module. The SONET transmission equipment of FIG. 19 is different from the SONET transmission equipment of FIG. 18 in that the data storage unit is provided in a separate module 202 from the switch module 201. The SONET transmission equipment having the construction of FIG. 19 can also achieve the substantially the same functions as those of the SONET transmission equipment of FIG. 5.

(7) Other Matters (i) Although the above embodiments are explained based on the SONET systems, substantially the same constructions can also be realized based on the SDH systems.

(ii) The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iii) All of the contents of the Japanese patent application, No.2001-344277 are incorporated into this specification by reference.

What is claimed is:

1. Data transmission equipment for use as a constituent of a multiplex transmission network, comprising:
   a reception unit which receives data;
   a control information extraction unit which extracts control information from said data received by the reception unit;
   a data acquisition unit which determines whether or not said control information includes a request for storage of said data, and acquires the data when said control information includes the request for storage of the data;
   a data storage unit which stores the data acquired by the data acquisition unit;
   a data erasing unit which determines whether or not said control information includes a request for erasing of said data stored in said data storage unit, and erases the data from the data storage unit when said control information includes the request for erasing of the data; and
   a data lock unit which determines whether or not said control information includes a request for locking said data stored in said data storage unit, and locks the data stored in said storage unit so that said stored data is protected against unintended erasing when said control information includes the request for locking the data.

2. The data transmission equipment according to claim 1, further comprising,
   a data readout unit which determines whether or not said control information includes a request for readout of first data and second data stored in said data storage unit, and reads out the first data and the second data from the data storage unit when said control information includes the request for readout of the first data and the second data, and
   a transmission unit which transmits said first data and said second data to a destination.

3. The data transmission equipment according to claim 2, wherein said reception unit receives said first data at a first transmission rate, said transmission unit transmits said second data at a second transmission rate, and the first and second transmission rates can be determined independently of each other.

4. The data transmission equipment according to claim 2, wherein said transmission unit transmits said second data to a plurality of destinations.

5. The data transmission equipment according to claim 2, further comprising a control information insertion unit which inserts control information in said second data transmitted by the transmission unit.

6. The data transmission equipment according to claim 1, wherein said data storage unit is arranged in said reception unit.

7. The data transmission equipment according to claim 1, wherein said data storage unit is arranged in said transmission unit.

8. The data transmission equipment according to claim 1, further comprising a switch unit which cross-connects transmission lines, and said data storage unit is arranged in the switch unit.

9. The data transmission equipment according to claim 1, wherein said reception unit receives said first data in accordance with one of SONET and SDH technologies.

10. The data transmission equipment according to claim 1, wherein said transmission unit transmits said second data in accordance with one of SONET and SDH technologies.

11. A method for transmitting data from a first network node to a second network node through an interlinking network including a plurality of data transmission equipment units, comprising the steps of:
    (a) transmitting said data together with a storage request for storage of the data and a lock request for locking the stored data in one of the plurality of data transmission equipment units, from said first network node to the one of the plurality of data transmission equipment units;
    (b) receiving said data, said storage request, and said lock request by said one of the plurality of data transmission equipment units;
    (c) storing said data in a storage unit provided in said one of the plurality of data transmission equipment units, based on said storage request;
    (d) transmitting a readout request for said data, from said second network node to the one of the plurality of data transmission equipment units;
    (e) receiving said readout request by said one of the plurality of data transmission equipment units;
    (f) reading out said data from said storage unit, based on said readout request; and
    (g) transmitting said data from said one of the plurality of data transmission equipment units to said second network node;
    (h) locking said data stored in said storage unit so that said stored data is protected against unintended erasing, based on said lock request;
    wherein said step (d) comprises the substeps of:
       (d1) transmitting said readout request from said second network node to said first network node; and
       (d2) transferring said readout request from said first network node to said one of the plurality of data transmission equipment units.

12. The method according to claim 11, wherein in said step (a), said data, said storage request, and said lock request are multiplexed.

* * * * *